US010686890B2

(12) United States Patent
Dutta et al.

(10) Patent No.: US 10,686,890 B2
(45) Date of Patent: Jun. 16, 2020

(54) KEEP-ALIVE SCHEDULER IN A NETWORK DEVICE

(71) Applicant: AVAGO TECHNOLOGIES INTERNATIONAL SALES PTE. LIMITED, Singapore (SG)

(72) Inventors: Rajib Dutta, Cupertino, CA (US); Michael Li, San Jose, CA (US); Aravindu Maneti, Bengaluru (IN)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 61 days.

(21) Appl. No.: 15/940,760

(22) Filed: Mar. 29, 2018

(65) Prior Publication Data

US 2018/0295192 A1 Oct. 11, 2018

Related U.S. Application Data

(63) Continuation of application No. PCT/US2017/035032, filed on May 30, 2017.

(30) Foreign Application Priority Data

May 31, 2016 (IN) .............................. 201641018590

(51) Int. Cl.
*H04L 29/08* (2006.01)
*H04L 12/26* (2006.01)
(Continued)

(52) U.S. Cl.
CPC ........ *H04L 67/145* (2013.01); *G06F 9/45558* (2013.01); *H04L 43/103* (2013.01);
(Continued)

(58) Field of Classification Search
CPC . H04L 67/145; H04L 67/146; H04L 67/2842; H04L 67/322; H04L 43/103;
(Continued)

(56) References Cited

U.S. PATENT DOCUMENTS 4,975,904 A * 12/1990 Mann ...................... H04L 29/00
370/389
5,058,108 A * 10/1991 Mann .................... G06F 15/161
370/409

(Continued)

FOREIGN PATENT DOCUMENTS

CN 102447878 A 5/2012
CN 101753597 B 4/2013
(Continued)

OTHER PUBLICATIONS

International Search Report and Written Opinion for PCT/US2017/035032, dated Sep. 10, 2017, 9 pages.

(Continued)

*Primary Examiner* — Azizul Choudhury
(74) *Attorney, Agent, or Firm* — Xsensus LLP

(57) ABSTRACT

A network device may execute a process (e.g., a software keep-alive process (SKAP)) that schedules the transmission of keep-alive messages or packets. The network device maintains a database of keep-alive network sessions storing information that is used for scheduling the transmission of the keep-alive messages or packets for the keep-alive network sessions. The database may be read and a next transmission time and session frequency for one or more keep-alive sessions may be determined. The one or more keep-alive sessions may then be placed in appropriate banks within a timer queue based on the determined next transmission time and session frequency. Each bank is associated with a time period from the current time. The keep-alive sessions having sooner next transmission times are placed in
(Continued)

higher priority banks. The scheduler may allow for real-time scheduling of the one or more keep-alive sessions.

24 Claims, 7 Drawing Sheets

(51) Int. Cl.
*G06F 9/455* (2018.01)
*H04L 29/06* (2006.01)

(52) U.S. Cl.
CPC ........ *H04L 67/146* (2013.01); *H04L 67/2842* (2013.01); *H04L 67/322* (2013.01); *H04L 69/28* (2013.01); *G06F 2009/45595* (2013.01)

(58) Field of Classification Search
CPC ................. H04L 69/28; G06F 9/45558; G06F 2009/45595
See application file for complete search history.

(56) References Cited

U.S. PATENT DOCUMENTS

| | | | |
|---|---|---|---|
| 6,047,330 A | 4/2000 | Stracke, Jr. et al. | |
| 6,144,669 A | 11/2000 | Williams et al. | |
| 6,370,656 B1 | 4/2002 | Olarig et al. | |
| 6,633,540 B1 | 10/2003 | Raisanen | |
| 7,120,688 B1 | 10/2006 | Nguyen et al. | |
| 7,619,987 B2 | 11/2009 | Mitsumori | |
| 7,698,409 B2 | 4/2010 | Kohonen | |
| 7,720,047 B1 | 5/2010 | Katz et al. | |
| 8,005,065 B2 | 8/2011 | Jia et al. | |
| 8,023,432 B2 | 9/2011 | Herzog | |
| 8,156,209 B1 | 4/2012 | Phadnis et al. | |
| 8,326,985 B2 | 12/2012 | Luna et al. | |
| 8,560,747 B1 | 10/2013 | Tan et al. | |
| 8,566,625 B2 | 10/2013 | Gobriel et al. | |
| 8,599,858 B1 | 12/2013 | Mizrahi | |
| 8,621,095 B1 | 12/2013 | DeSanti | |
| 8,693,313 B2 | 4/2014 | Negoto et al. | |
| 8,711,704 B2 | 4/2014 | Werb et al. | |
| 8,862,774 B2 | 10/2014 | Vasseur et al. | |
| 8,892,928 B2 | 11/2014 | Maciocco et al. | |
| 8,977,753 B1 | 3/2015 | Watson et al. | |
| 9,198,151 B2 | 11/2015 | Daudin et al. | |
| 9,271,237 B2 | 2/2016 | Nirantar et al. | |
| 2003/0128676 A1 | 7/2003 | Lee | |
| 2007/0234332 A1 | 10/2007 | Brundridge et al. | |
| 2009/0300189 A1* | 12/2009 | Takeda | H04L 67/14 709/227 |
| 2011/0299613 A1 | 12/2011 | Duff et al. | |
| 2012/0151085 A1 | 6/2012 | Singh et al. | |
| 2012/0185723 A1* | 7/2012 | Jaffar | G06F 11/0793 714/5.1 |
| 2012/0221700 A1 | 8/2012 | Dutta et al. | |
| 2014/0112318 A1 | 4/2014 | Zhou et al. | |
| 2014/0211764 A1 | 7/2014 | Sundararajan et al. | |
| 2015/0151085 A1 | 6/2015 | Tan et al. | |
| 2015/0304201 A1 | 10/2015 | Onishi et al. | |
| 2016/0234307 A1 | 8/2016 | Yan et al. | |

FOREIGN PATENT DOCUMENTS

| | | |
|---|---|---|
| CN | 103916424 A | 7/2014 |
| WO | 2016032532 A1 | 3/2016 |
| WO | 2017210208 A1 | 12/2017 |
| WO | 2017210209 | 12/2017 |

OTHER PUBLICATIONS

International Search Report and Written Opinion for PCT/US2017/035030, dated Sep. 7, 2017, 9 pages.

* cited by examiner

KEEP-ALIVE SCHEDULER IN A NETWORK DEVICE

CROSS-REFERENCE TO RELATED APPLICATIONS

This application is a continuation of PCT Application No. PCT/US2017/035032, filed on May 30, 2017, which claims the benefit of and priority to Indian Provisional Application No. 201641018590, filed May 31, 2016. The contents of each of the aforementioned applications are hereby incorporated herein in their entireties and for all purposes.

BACKGROUND

In computer networking, keep-alive (KA) messages or packets (also sometimes referred to as hello messages) are commonly used for a variety of different purposes including to check connectivity and the health of network devices. For example, a particular network device may transmit keep-alive messages to other network devices (e.g., to the neighbors of the particular network device) at regular time intervals. A network device receiving the keep-alive messages may use the messages to determine the health of the sender of the messages and also to check connectivity to the sender of the messages (e.g., check whether a link between the particular network device and the network device receiving the messages is operational), and the like. If a network device, such as a router, stops receiving keep-alive messages from a neighbor, after a set period (sometimes referred to as the dead interval), the router may assume the neighbor network device has gone down or there is something wrong with the connectivity to the neighbor network device, and take responsive actions. For example, if the recipient network device determines that a link is down due to not receiving keep-alive messages from a particular network device, the recipient network device may use a different path to route data until the link is up again.

A network device may receive and transmit different types of keep-alive messages corresponding to different protocols that involve sending of keep-alive messages. Examples of protocols that involve transmission of keep-alive messages at regular intervals include Intermediate System-Intermediate System (IS-IS), Resource Reservation Protocol (RSVP), Multiple Spanning Tree Protocol (MSTP), Link Aggregation Control Protocol (LACP), Open Shortest Path First (OSPF), Unidirectional Link Detection (UDLD), Generic Routing Encapsulation (GRE), Rapid Spanning Tree Protocol (RSTP), and others. A network device may open and maintain a session ("keep-alive network session") to facilitate the transmission of keep-alive messages. Different such keep-alive network sessions may be opened and maintained by a network device for different protocols. Several of the sessions may be maintained in parallel. For each session, the network device is configured to transmit keep-alive messages at regular pre-defined time intervals specified by the protocol associated with the session. A keep-alive message transmitted for a session may identify the associated protocol and may also comprise information identifying the session for which the message has been transmitted.

As indicated above, keep-alive messages for a session have to be sent at predefined time intervals, where the duration of the time interval is typically defined by the keep-alive protocol corresponding to that session. For example, for the OSPF protocol, keep-alive messages have to be transmitted every ten seconds. As another example, for the IS-IS protocol, keep-alive messages have to be transmitted every ten seconds. For some other protocols, keep-alive messages may have to be transmitted every second.

As networks have gotten faster and for detecting network problems faster, the time intervals for sending keep-alive messages have gotten shorter. These periodic time intervals can be in the order of milliseconds (msecs) or even faster. For example, for the UDLD protocol, the periodic time interval is 500 msecs. In another example, some protocols may have a periodic time interval of 100 msecs. Such reduced time intervals are becoming problematic for network device that are not capable of handling the transmission of keep-alive messages within such short time intervals.

The problem is further compounded for network devices that provide high availability (HA) by supporting non-stop routing (NSR) and/or non-stop forwarding (NSF). In such a network device, the data forwarding or routing functionality provided by the network device is expected to continue without much impact even when the network device experiences certain events (e.g., a soft reboot, software upgrade, certain component failures) that impact the functionality of the network device. Such NSR or NSF functionality is typically provided using redundant subsystems. In a typical setup, a network device provides redundant subsystems for performing data forwarding or routing functions that are configured to operate according to the active-standby model of operation. In such implementations, one of the subsystems operates in an "active" mode and performs a set of networking functions while the other subsystem operates in a "standby" mode in which the set of functions performed by the subsystem operating in the active mode are not performed. In response to certain events, a failover or switchover may occur that causes the subsystem previously operating in the standby mode prior to the failover to start operating in the active mode and take over performance of the functions performed in active mode. The previous subsystem operating in active mode may operate in the standby mode. This enables the set of networking functions performed by the network device to continue to be performed without significant interruption.

In conventional network devices, transmission of keep-alive messages is handled by the subsystem operating in standby mode. However, the failover or switchover itself may take a few seconds or even a few minutes. During this time period keep-alive message may not be sent by the network device until the new active subsystem becomes fully functional (because the previous active subsystem is no longer active and the previous standby subsystem is in the process of being "brought up" in active mode). This can be problematic, for example, for keep-alive protocols requiring keep-alive messages to be sent in time intervals in the order of milliseconds. This may cause one or more devices in the network receiving the keep-alive messages to incorrectly assume that a particular keep-alive network session is no longer active or has been dropped, that the sender network device is down or a link is no longer operating.

BRIEF SUMMARY

The present disclosure relates generally to networking technologies, and more particularly to mechanisms for sending keep-alive messages or packets. More specifically, the present disclosure relates to a network device that is configured to send uninterrupted non-stop keep-alive messages or packets for multiple keep-alive network sessions.

A network device may execute a process (e.g., a software keep-alive process (SKAP)) that enables the network device to continue to send keep-alive messages or packets without interruption even during events such as a subsystem switchover or an in-place system upgrade. The network device maintains a database of keep-alive network sessions storing information that is used to schedule and send keep-alive messages or packets. The database may be shared between multiple subsystems and programs executed by the network device. In certain embodiments, the database may be updated by a subsystem executed by the processor and the information may then be used by the SKAP to schedule and send out keep-alive messages or packets. The shared database may be highly scalable and flexible in order to allow a variety of protocols to be supported both presently and in the future.

A majority of networking protocols are session based, which means peers of protocols exchange keep-alive messages or packets ("heartbeats") to establish and allow continuation of the connectivity amongst them. Failure of such keep-alive messages or packets may result in session disconnect and cleanup of the session so that there is a finite set of connectivity. Thus, the SKAP may ensure, unless a protocol decides otherwise, that the keep-alive messages or packets have to continue at all times, e.g. during included software upgrades (a.k.a In Service Software Upgrade (ISSU)), planned Active-Standby switchover, unplanned failover, etc.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a network device including: a database configured to store data for one or more keep-alive network sessions for the network device. The network device also includes one or processors executing a first virtual machine and a keep-alive subsystem process; where the first virtual machine is configured to: perform a set of functions to facilitate forwarding of data packets from the network device; and store information for a first keep-alive network session in the database, the information for the first keep-alive network session including information identifying a keep-alive protocol for the first keep-alive network session and information identifying a time interval period for transmitting keep-alive packets for the first keep-alive network session; and where the keep-alive subsystem process is configured to: access the information for the first keep-alive network session from the database; and based at least in part on the information for the first keep-alive network session stored in the database, schedule transmission of one or more keep-alive packets for the first keep-alive network session from the network device. Other embodiments of this aspect include corresponding computer systems, apparatus, and computer programs recorded on one or more computer storage devices, each configured to perform the actions of the methods.

Implementations may include one or more of the following features. The network device where: the one or more processors execute a second virtual machine. The network device may also include a first virtual machine that operates in an active mode and performs a set of functions. The network device may also include a second virtual machine that operates in a standby mode while the first virtual machine operates in the active mode, where the second virtual machine does not perform the set of functions when operating in the standby mode.

The network device further including: a set of one or more line cards. The network device may also include a backplane enabling communications between the set of line cards. The network device may be configured such that the one or more processors and the database are located on a first line card from the set of line cards.

The network device further including: a packet processor configured to transmit the scheduled one or more keep-alive packets from the network device via one or more ports of the network device.

The network device where the keep-alive subsystem process is, based at least in part on the information for the first keep-alive network session stored in the database, configured to: determine a transmission time of a most recent transmitted keep-alive packet for the first keep-alive network session. The network device may also determine a keep-alive transmission frequency for the first keep-alive network session. The network device may also determine, based upon the transmission time of the most recent transmitted keep-alive packet for the first keep-alive network session and the keep-alive transmission frequency for the first keep-alive network session, a transmission time for transmitting a next keep-alive packet from the network device for the first keep-alive network session.

The network device where: the one or more processors are configured to execute a host operating system. The network device may also be configured such that the keep-alive subsystem process is executed within a user space of the host operating system. The network device where the host operating system is Linux.

The network device where: the first virtual machine is configured to: store information for a second keep-alive network session to the database, the information for the second keep-alive network session including information identifying a keep-alive protocol for the second keep-alive network session and information identifying a time interval period for transmitting keep-alive packets for the second keep-alive network session; and where the keep-alive subsystem process is configured to: access the information for the second keep-alive network session from the database; and based at least in part on the information for the second keep-alive network session stored in the database, schedule transmission of one or more keep-alive packets for the second keep-alive network session from the network device.

The network device where the keep-alive protocol for the first keep-alive network session is same as the keep-alive protocol for the second keep-alive network session. The network device where the keep-alive protocol for the first keep-alive network session is different from the keep-alive protocol for the second keep-alive network session and the time interval period for transmitting keep-alive packets for the first keep-alive network session is different from the time interval period for transmitting keep-alive packets for the second keep-alive network session.

The method further including executing, via the processor, a second virtual machine, where: the first virtual machine operates in an active mode and performs the set of functions. The method may also include executing, via the processor, a second virtual machine that operates in a standby mode while the first virtual machine operates in the active mode, where the second virtual machine does not perform the set of functions when operating in the standby mode.

The method where the network device includes: a set of one or more line cards. The method may also include a backplane enabling communications between the set of line cards. The method may also include the network device where the one or more processors and the database are located on a first line card from the set of line cards.

The method further including transmitting, via a packet processor, the scheduled one or more keep-alive packets from the network device via one or more ports of the network device.

The method further including: determining, via the keep-alive subsystem process and based at least in part on the information for the first keep-alive network session stored in the database, a transmission time of a most recent transmitted keep-alive packet for the first keep-alive network session. The method may also include determining, via the keep-alive subsystem process and based at least in part on the information for the first keep-alive network session stored in the database, a keep-alive transmission frequency for the first keep-alive network session. The method may also include determining, via the keep-alive subsystem process and based upon the transmission time of the most recent transmitted keep-alive packet for the first keep-alive network session and the keep-alive transmission frequency for the first keep-alive network session, a transmission time for transmitting a next keep-alive packet from the network device for the first keep-alive network session.

The method where the first virtual machine is configured to store information for a second keep-alive network session to the database, the information for the second keep-alive network session including information identifying a keep-alive protocol for the second keep-alive network session and information identifying a time interval period for transmitting keep-alive packets for the second keep-alive network session, and the method further includes: accessing, via the keep-alive subsystem process, the information for the second keep-alive network session from the database. The method may also include, based at least in part on the information for the second keep-alive network session stored in the database, scheduling, via the keep-alive subsystem process, transmission of one or more keep-alive packets for the second keep-alive network session from the network device.

The one or more non-transitory computer-readable media where the instructions, when executed by the one or more computing devices, cause the one or more computing devices to execute, via the processor, a second virtual machine, where: the first virtual machine operates in an active mode and performs the set of functions. The one or more non-transitory computer-readable media may also include instructions for executing a second virtual machine, which operates in a standby mode while the first virtual machine operates in the active mode, where the second virtual machine does not perform the set of functions when operating in the standby mode.

The one or more non-transitory computer-readable media where the network device includes: a set of one or more line cards. The one or more non-transitory computer-readable media where the network device may also include a backplane enabling communications between the set of line cards. The one or more non-transitory computer-readable media where the network device may also include where the one or more processors and the database are located on a first line card from the set of line cards.

The one or more non-transitory computer-readable media where the instructions, when executed by the one or more computing devices, cause the one or more computing devices to transmit, via a packet processor, the scheduled one or more keep-alive packets from the network device via one or more ports of the network device.

The one or more non-transitory computer-readable media where the instructions, when executed by the one or more computing devices, cause the one or more computing devices to: determine, via the keep-alive subsystem process and based at least in part on the information for the first keep-alive network session stored in the database, a transmission time of a most recent transmitted keep-alive packet for the first keep-alive network session. The one or more non-transitory computer-readable media may also include instructions that cause the one or more computing devices to: determine, via the keep-alive subsystem process and based at least in part on the information for the first keep-alive network session stored in the database, a keep-alive transmission frequency for the first keep-alive network session. The one or more non-transitory computer-readable media may also include instructions that cause the one or more computing devices to: determine, via the keep-alive subsystem process and based upon the transmission time of the most recent transmitted keep-alive packet for the first keep-alive network session and the keep-alive transmission frequency for the first keep-alive network session, a transmission time for transmitting a next keep-alive packet from the network device for the first keep-alive network session.

The one or more non-transitory computer-readable media where the first virtual machine is configured to store information for a second keep-alive network session to the database, the information for the second keep-alive network session including information identifying a keep-alive protocol for the second keep-alive network session and information identifying a time interval period for transmitting keep-alive packets for the second keep-alive network session, and where the instructions, when executed by the one or more computing devices, cause the one or more computing devices to: access, via the keep-alive subsystem process, the information for the second keep-alive network session from the database. The one or more non-transitory computer-readable media may also include instructions that cause the one or more computing devices to, based at least in part on the information for the second keep-alive network session stored in the database, schedule, via the keep-alive subsystem process, transmission of one or more keep-alive packets for the second keep-alive network session from the network device.

The method where the first virtual machine and the keep-alive subsystem process are executed by one or more processors. Implementations of the described techniques may include hardware, a method or process, or computer software on a computer-accessible medium.

One general aspect includes a method including: executing, via a processor on a network device, a first virtual machine and a keep-alive subsystem process, where the first virtual machine is configured to: perform a set of functions to facilitate forwarding of data packets from the network device; and store information for a first keep-alive network session in the database, the information for the first keep-alive network session including information identifying a keep-alive protocol for the first keep-alive network session and information identifying a time interval period for transmitting keep-alive packets for the first keep-alive network session. The method also includes accessing, via the keep-alive subsystem process, the information for the first keep-alive network session from the database. The method also includes, based at least in part on the information for the first keep-alive network session stored in the database, scheduling, via the keep-alive subsystem process, transmission of one or more keep-alive packets for the first keep-alive network session from the network device. Other embodiments of this aspect include corresponding computer systems, apparatus, and computer programs recorded on one or more computer storage devices, each configured to perform the actions of the methods.

Implementations may include one or more of the following features. The method further including executing, via the processor, a second virtual machine, where: the first virtual machine operates in an active mode and performs the set of functions. The method may also include operating the second virtual machine in a standby mode while the first virtual machine operates in the active mode, where the second virtual machine does not perform the set of functions when operating in the standby mode.

The method where the network device includes: a set of one or more line cards. The method may also include a network device that includes a backplane enabling communications between the set of line cards. The method may also include a network device where the one or more processors and the database are located on a first line card from the set of line cards.

The method further including transmitting, via a packet processor, the scheduled one or more keep-alive packets from the network device via one or more ports of the network device.

The method further including: determining, via the keep-alive subsystem process and based at least in part on the information for the first keep-alive network session stored in the database, a transmission time of a most recent transmitted keep-alive packet for the first keep-alive network session. The method may also include determining, via the keep-alive subsystem process and based at least in part on the information for the first keep-alive network session stored in the database, a keep-alive transmission frequency for the first keep-alive network session. The method may also include determining, via the keep-alive subsystem process and based upon the transmission time of the most recent transmitted keep-alive packet for the first keep-alive network session and the keep-alive transmission frequency for the first keep-alive network session, a transmission time for transmitting a next keep-alive packet from the network device for the first keep-alive network session.

The method where the first virtual machine is configured to store information for a second keep-alive network session to the database, the information for the second keep-alive network session including information identifying a keep-alive protocol for the second keep-alive network session and information identifying a time interval period for transmitting keep-alive packets for the second keep-alive network session, and the method further including: accessing, via the keep-alive subsystem process, the information for the second keep-alive network session from the database. The method may also include, based at least in part on the information for the second keep-alive network session stored in the database, scheduling, via the keep-alive subsystem process, transmission of one or more keep-alive packets for the second keep-alive network session from the network device.

The one or more non-transitory computer-readable media where the instructions, when executed by the one or more computing devices, cause the one or more computing devices to execute, via the processor, a second virtual machine, where: the first virtual machine operates in an active mode and performs the set of functions. The one or more non-transitory computer-readable media may also include instructions that cause the one or more computing devices to operate the second virtual machine in a standby mode while the first virtual machine operates in the active mode, where the second virtual machine does not perform the set of functions when operating in the standby mode.

The one or more non-transitory computer-readable media where the network device includes: a set of one or more line cards. The one or more non-transitory computer-readable media where the network device may also include a backplane enabling communications between the set of line cards. The one or more non-transitory computer-readable media where the network device may also include where the one or more processors and the database are located on a first line card from the set of line cards.

The one or more non-transitory computer-readable media where the instructions, when executed by the one or more computing devices, cause the one or more computing devices to transmit, via a packet processor, the scheduled one or more keep-alive packets from the network device via one or more ports of the network device.

The one or more non-transitory computer-readable media where the instructions, when executed by the one or more computing devices, cause the one or more computing devices to: determine, via the keep-alive subsystem process and based at least in part on the information for the first keep-alive network session stored in the database, a transmission time of a most recent transmitted keep-alive packet for the first keep-alive network session. The one or more non-transitory computer-readable media may also include instructions that cause the one or more computing devices to determine, via the keep-alive subsystem process and based at least in part on the information for the first keep-alive network session stored in the database, a keep-alive transmission frequency for the first keep-alive network session. The one or more non-transitory computer-readable media may also include instructions that cause the one or more computing devices determine, via the keep-alive subsystem process and based upon the transmission time of the most recent transmitted keep-alive packet for the first keep-alive network session and the keep-alive transmission frequency for the first keep-alive network session, a transmission time for transmitting a next keep-alive packet from the network device for the first keep-alive network session.

The one or more non-transitory computer-readable media where the first virtual machine is configured to store information for a second keep-alive network session to the database, the information for the second keep-alive network session including information identifying a keep-alive protocol for the second keep-alive network session and information identifying a time interval period for transmitting keep-alive packets for the second keep-alive network session, and where the instructions, when executed by the one or more computing devices, cause the one or more computing devices to: access, via the keep-alive subsystem process, the information for the second keep-alive network session from the database. The one or more non-transitory computer-readable media may also include instructions that cause the one or more computing devices to, based at least in part on the information for the second keep-alive network session stored in the database, schedule, via the keep-alive subsystem process, transmission of one or more keep-alive packets for the second keep-alive network session from the network device.

The method where the first virtual machine and the keep-alive subsystem process are executed by one or more processors. Implementations of the described techniques may include hardware, a method or process, or computer software on a computer-accessible medium.

One general aspect includes one or more non-transitory computer-readable media storing computer-executable instructions that, when executed by one or more computing devices, cause the one or more computing devices to: execute, via a processor on a network device, a first virtual machine and a keep-alive subsystem process, where the first virtual machine is configured to: The one or more non-transitory computer-readable media also includes perform a set of functions to facilitate forwarding of data packets from a network device; and store information for a first keep-alive network session in the database, the information for the first keep-alive network session including information identifying a keep-alive protocol for the first keep-alive network session and information identifying a time interval period for transmitting keep-alive packets for the first keep-alive network session. The one or more non-transitory computer-readable media also includes access, via the keep-alive subsystem process, the information for the first keep-alive network session from the database. The one or more non-transitory computer-readable media also includes based at least in part on the information for the first keep-alive network session stored in the database, schedule, via the keep-alive subsystem process, transmission of one or more keep-alive packets for the first keep-alive network session from the network device. Other embodiments of this aspect include corresponding computer systems, apparatus, and computer programs recorded on one or more computer storage devices, each configured to perform the actions of the methods.

Implementations may include one or more of the following features. The one or more non-transitory computer-readable media where the instructions, when executed by the one or more computing devices, cause the one or more computing devices to execute, via the processor, a second virtual machine, where: the first virtual machine operates in an active mode and performs the set of functions. The one or more non-transitory computer-readable media may also include the second virtual machine operates in a standby mode while the first virtual machine operates in the active mode, where the second virtual machine does not perform the set of functions when operating in the standby mode.

The one or more non-transitory computer-readable media where the network device includes: a set of one or more line cards. The one or more non-transitory computer-readable media may also include a backplane enabling communications between the set of line cards. The one or more non-transitory computer-readable media may also include where the one or more processors and the database are located on a first line card from the set of line cards.

The one or more non-transitory computer-readable media where the instructions, when executed by the one or more computing devices, cause the one or more computing devices to transmit, via a packet processor, the scheduled one or more keep-alive packets from the network device via one or more ports of the network device.

The one or more non-transitory computer-readable media where the instructions, when executed by the one or more computing devices, cause the one or more computing devices to: determine, via the keep-alive subsystem process and based at least in part on the information for the first keep-alive network session stored in the database, a transmission time of a most recent transmitted keep-alive packet for the first keep-alive network session. The one or more non-transitory computer-readable media may also include instructions that cause the one or more computing devices to determine, via the keep-alive subsystem process and based at least in part on the information for the first keep-alive network session stored in the database, a keep-alive transmission frequency for the first keep-alive network session.

The one or more non-transitory computer-readable media may also include instructions that cause the one or more computing devices to determine, via the keep-alive subsystem process and based upon the transmission time of the most recent transmitted keep-alive packet for the first keep-alive network session and the keep-alive transmission frequency for the first keep-alive network session, a transmission time for transmitting a next keep-alive packet from the network device for the first keep-alive network session.

The one or more non-transitory computer-readable media where the first virtual machine is configured to store information for a second keep-alive network session to the database, the information for the second keep-alive network session including information identifying a keep-alive protocol for the second keep-alive network session and information identifying a time interval period for transmitting keep-alive packets for the second keep-alive network session, and where the instructions, when executed by the one or more computing devices, cause the one or more computing devices to: access, via the keep-alive subsystem process, the information for the second keep-alive network session from the database. The one or more non-transitory computer-readable media may also include instructions that cause the one or more computing devices to, based at least in part on the information for the second keep-alive network session stored in the database, schedule, via the keep-alive subsystem process, transmission of one or more keep-alive packets for the second keep-alive network session from the network device. The method where the first virtual machine and the keep-alive subsystem process are executed by one or more processors. Implementations of the described techniques may include hardware, a method or process, or computer software on a computer-accessible medium.

One general aspect includes a method including: performing, via a first virtual machine, a set of functions to facilitate forwarding of data packets from the network device. The method also includes storing, via the first virtual machine, information for a first keep-alive network session in the database, the information for the first keep-alive network session including information identifying a keep-alive protocol for the first keep-alive network session and information identifying a time interval period for transmitting keep-alive packets for the first keep-alive network session. The method also includes accessing, via a keep-alive subsystem process, the information for the first keep-alive network session from the database. The method also includes, based at least in part on the information for the first keep-alive network session stored in the database, scheduling, via the keep-alive subsystem process, transmission of one or more keep-alive packets for the first keep-alive network session from the network device. Other embodiments of this aspect include corresponding computer systems, apparatus, and computer programs recorded on one or more computer storage devices, each configured to perform the actions of the methods.

Implementations may include one or more of the following features. The method where the first virtual machine and the keep-alive subsystem process are executed by one or more processors. Implementations of the described techniques may include hardware, a method or process, or computer software on a computer-accessible medium.

One general aspect includes the method of any of the above embodiments, further including executing, via the processor, a second virtual machine, where: the first virtual machine operates in an active mode and performs the set of functions. The method also includes the second virtual machine operates in a standby mode while the first virtual machine operates in the active mode, where the second virtual machine does not perform the set of functions when operating in the standby mode. Other embodiments of this aspect include corresponding computer systems, apparatus, and computer programs recorded on one or more computer storage devices, each configured to perform the actions of the methods.

One general aspect includes the method of any of the above embodiments, further including transmitting, via a packet processor, the scheduled one or more keep-alive packets from the network device via one or more ports of the network device. Other embodiments of this aspect include corresponding computer systems, apparatus, and computer programs recorded on one or more computer storage devices, each configured to perform the actions of the methods.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method including: reading a database configured to store data for one or more keep-alive network sessions for a network device. The method also includes determining, based on reading the database, a next transmission time for one of the one or more keep-alive network sessions based on a previous transmission time for the one of the one or more keep-alive network sessions and a keep-alive network session frequency for the one of the one or more keep-alive network sessions. The method also includes placing, based at least in part on the determined next transmission time for the one of the one or more keep-alive network sessions, a session identifier for the one of the one or more keep-alive network sessions in a first bank of a plurality of banks within a timer queue, the first bank for storing entries for keep-alive network sessions for which keep-alive packets have to be transmitted within a first time period from the current time, the plurality of banks further including a second bank for storing entries for keep-alive network sessions for which keep-alive packets have to be transmitted after the first time period and within a second time period from the current time. The method also includes transmitting, via a packet processor of the network device, a keep-alive packet within the first period of time from the current time for the one of the one or more keep-alive network sessions placed in the first bank. Other embodiments of this aspect include corresponding computer systems, apparatus, and computer programs recorded on one or more computer storage devices, each configured to perform the actions of the methods.

Implementations may include one or more of the following features. The method where the database is accessible by a first virtual machine and a second virtual machine being executed by a line card on the network device. The method where at least one of the first virtual machine or second virtual machine stores data for the one or more keep-alive network sessions in the database. The method where: the first virtual machine operates in an active mode and performs a set of functions to facilitate forwarding of data packets from the network device. The method may also include the second virtual machine operates in a standby mode while the first virtual machine operates in the active mode, where the second virtual machine does not perform the set of functions when operating in the standby mode. The method where the first time period is ten milliseconds. The method where the plurality of banks includes ten banks. The method where if the next transmission time is before the current time, the session identifier for the one of the one or more keep-alive network sessions is placed in a highest priority bank.

The network device where the database is accessible by a first virtual machine and a second virtual machine being executed by a line card on the network device. The network device where at least one of the first virtual machine or second virtual machine stores data for the one or more keep-alive network sessions in the database. The network device where: the first virtual machine operates in an active mode and performs a set of functions to facilitate forwarding of data packets from the network device. The network device may also include the second virtual machine operates in a standby mode while the first virtual machine operates in the active mode, where the second virtual machine does not perform the set of functions when operating in the standby mode. The network device where the first time period is ten milliseconds. The network device where the plurality of banks includes ten banks. The network device where if the next transmission time is before the current time, the session identifier for the one of the one or more keep-alive network sessions is placed in a highest priority bank.

The one or more non-transitory computer-readable media where the database is accessible by a first virtual machine and a second virtual machine being executed by a line card on the network device. The one or more non-transitory computer-readable media where at least one of the first virtual machine or second virtual machine stores data for the one or more keep-alive network sessions in the database. The one or more non-transitory computer-readable media where: the first virtual machine operates in an active mode and performs a set of functions to facilitate forwarding of data packets from the network device. The one or more non-transitory computer-readable media may also include the second virtual machine operates in a standby mode while the first virtual machine operates in the active mode, where the second virtual machine does not perform the set of functions when operating in the standby mode. The one or more non-transitory computer-readable media where the first time period is ten milliseconds. The one or more non-transitory computer-readable media where the plurality of banks includes ten banks. The one or more non-transitory computer-readable media where if the next transmission time is before the current time, the session identifier for the one of the one or more keep-alive network sessions is placed in a highest priority bank. The method further including transmitting, via a packet processor of the network device, a keep-alive packet within the first period of time from the current time for the one of the one or more keep-alive network sessions placed in the first bank. Implementations of the described techniques may include hardware, a method or process, or computer software on a computer-accessible medium.

One general aspect includes a network device including: a database configured to store data for one or more keep-alive network sessions for the network device; one or more processors executing a keep-alive subsystem process, where the keep-alive subsystem process is configured to: The network device also includes read the database. The network device also includes determine, based on reading the database, a next transmission time for one of the one or more keep-alive network sessions based on a previous transmission time for the one of the one or more keep-alive network sessions and a keep-alive network session frequency for the one of the one or more keep-alive network sessions. The network device also includes place, based at least in part on the determined next transmission time for the one of the one or more keep-alive network sessions, a session identifier for the one of the one or more keep-alive network sessions in a first bank of a plurality of banks within a timer queue, the first bank for storing entries for keep-alive network sessions for which keep-alive packets have to be transmitted within a first time period from the current time, the plurality of banks further including a second bank for storing entries for keep-alive network sessions for which keep-alive packets have to be transmitted after the first time period and within a second time period from the current time. The network device also includes transmit, via a packet processor of the network device, a keep-alive packet within the first period of time from the current time for the one of the one or more keep-alive network sessions placed in the first bank. Other embodiments of this aspect include corresponding computer systems, apparatus, and computer programs recorded on one or more computer storage devices, each configured to perform the actions of the methods.

Implementations may include one or more of the following features. The network device where the database is accessible by a first virtual machine and a second virtual machine being executed by a line card on the network device. The network device where at least one of the first virtual machine or second virtual machine stores data for the one or more keep-alive network sessions in the database. The network device where: the first virtual machine operates in an active mode and performs a set of functions to facilitate forwarding of data packets from the network device. The network device may also include the second virtual machine operates in a standby mode while the first virtual machine operates in the active mode, where the second virtual machine does not perform the set of functions when operating in the standby mode. The network device where the first time period is ten milliseconds. The network device where the plurality of banks includes ten banks. The network device where if the next transmission time is before the current time, the session identifier for the one of the one or more keep-alive network sessions is placed in a highest priority bank.

The one or more non-transitory computer-readable media where the database is accessible by a first virtual machine and a second virtual machine being executed by a line card on the network device. The one or more non-transitory computer-readable media where at least one of the first virtual machine or second virtual machine stores data for the one or more keep-alive network sessions in the database. The one or more non-transitory computer-readable media where: the first virtual machine operates in an active mode and performs a set of functions to facilitate forwarding of data packets from the network device. The one or more non-transitory computer-readable media may also include instructions where the second virtual machine operates in a standby mode while the first virtual machine operates in the active mode, where the second virtual machine does not perform the set of functions when operating in the standby mode. The one or more non-transitory computer-readable media where the first time period is ten milliseconds. The one or more non-transitory computer-readable media where the plurality of banks includes ten banks. The one or more non-transitory computer-readable media where if the next transmission time is before the current time, the session identifier for the one of the one or more keep-alive network sessions is placed in a highest priority bank. The method further including transmitting, via a packet processor of the network device, a keep-alive packet within the first period of time from the current time for the one of the one or more keep-alive network sessions placed in the first bank. Implementations of the described techniques may include hardware, a method or process, or computer software on a computer-accessible medium.

One general aspect includes one or more non-transitory computer-readable media storing computer-executable instructions that, when executed by one or more computing devices, cause the one or more computing devices to: read a database configured to store data for one or more keep-alive network sessions for a network device. The one or more non-transitory computer-readable media also include instructions that cause the computing devices to determine, based on reading the database, a next transmission time for one of the one or more keep-alive network sessions based on a previous transmission time for the one of the one or more keep-alive network sessions and a keep-alive network session frequency for the one of the one or more keep-alive network sessions. The one or more non-transitory computer-readable media also includes instructions that cause the computing devices to place, based at least in part on the determined next transmission time for the one of the one or more keep-alive network sessions, a session identifier for the one of the one or more keep-alive network sessions in a first bank of a plurality of banks within a timer queue, the first bank for storing entries for keep-alive network sessions for which keep-alive packets have to be transmitted within a first time period from the current time, the plurality of banks further including a second bank for storing entries for keep-alive network sessions for which keep-alive packets have to be transmitted after the first time period and within a second time period from the current time. The one or more non-transitory computer-readable media also includes instructions that cause the computing devices to transmit, via a packet processor of the network device, a keep-alive packet within the first period of time from the current time for the one of the one or more keep-alive network sessions placed in the first bank. Other embodiments of this aspect include corresponding computer systems, apparatus, and computer programs recorded on one or more computer storage devices, each configured to perform the actions of the methods.

Implementations may include one or more of the following features. The one or more non-transitory computer-readable media where the database is accessible by a first virtual machine and a second virtual machine being executed by a line card on the network device. The one or more non-transitory computer-readable media where at least one of the first virtual machine or second virtual machine stores data for the one or more keep-alive network sessions in the database. The one or more non-transitory computer-readable media where: the first virtual machine operates in an active mode and performs a set of functions to facilitate forwarding of data packets from the network device. The one or more non-transitory computer-readable media may also include instructions where the second virtual machine operates in a standby mode while the first virtual machine operates in the active mode, where the second virtual machine does not perform the set of functions when operating in the standby mode. The one or more non-transitory computer-readable media where the first time period is ten milliseconds. The one or more non-transitory computer-readable media where the plurality of banks includes ten banks. The one or more non-transitory computer-readable media where if the next transmission time is before the current time, the session identifier for the one of the one or more keep-alive network sessions is placed in a highest priority bank. The method further including transmitting, via a packet processor of the network device, a keep-alive packet within the first period of time from the current time for the one of the one or more keep-alive network sessions placed in the first bank. Implementations of the described techniques may include hardware, a method or process, or computer software on a computer-accessible medium.

Various embodiments are claimed directed to a system, a method, and a non-transitory computer-readable medium storing a plurality of instructions executable by one or more processors, wherein any feature mentioned in one claim category, e.g. method, can be claimed in another claim category, e.g., a system, as well. The dependencies or references back in the attached claims are chosen for formal reasons only. However any subject matter resulting from a deliberate reference back to any previous claims (in particular multiple dependencies) can be claimed as well, so that any combination of claims and the features thereof is disclosed and can be claimed regardless of the dependencies chosen in the claims. The subject-matter which can be claimed comprises not only the combinations of features as set out in the claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the claims.

DETAILED DESCRIPTION

Figure 1:
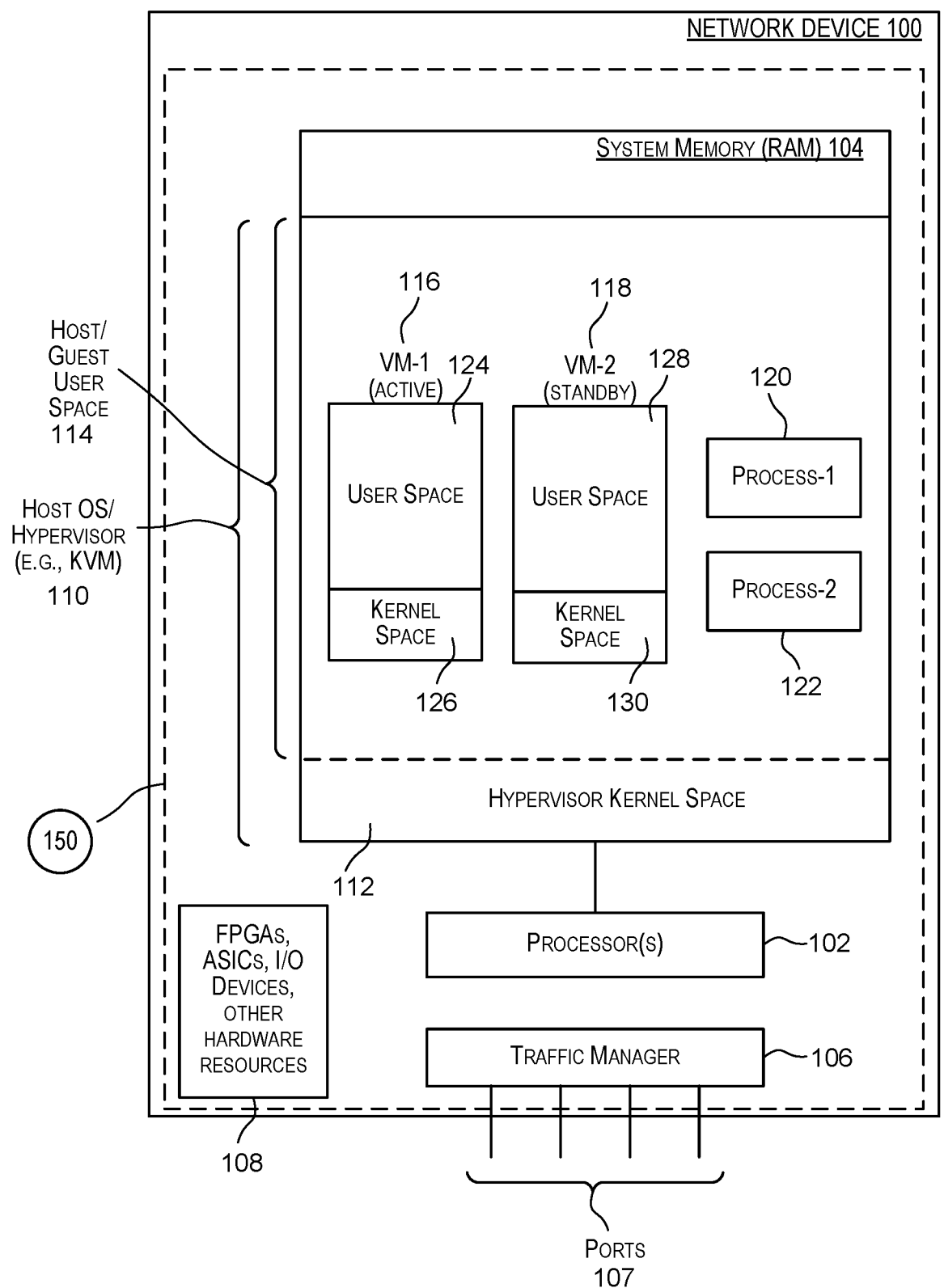
FIG. 1 is a simplified block diagram of a network device (also referred to as a "host system") that may incorporate teachings disclosed herein according to certain embodiments.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to networking technologies, and more particularly to techniques for sending keep-alive messages or packets. More specifically, the present disclosure relates to a network device that is configured to send non-stop keep-alive messages or packets for multiple keep-alive network sessions. The network device may execute a process (e.g., a software keep-alive process (SKAP)) that enables the network device to continue to send keep-alive messages or packets without interruption even during events such as a virtual machine switchover or in-place system upgrade. The network device may maintain a shared database of keep-alive network sessions storing information that is used to schedule and send keep-alive messages or packets. The shared database may be shared between multiple subsystems and programs executed by the network device. In certain embodiments, the database may be updated by a virtual machine executed by the network device and the information may then be used by the SKAP process to schedule and send out keep-alive messages or packets. The shared database may be highly scalable and flexible in order to allow a variety of protocols to be supported both presently and in the future.

A keep-alive network session is a network session during which the network device transmits keep-alive messages (also sometimes referred to as hello messages) from the network device to its neighboring network devices at regular intervals according to some protocol. Examples of protocols that involve sending of keep-alive messages include Intermediate System-Intermediate System (IS-IS), Resource Reservation Protocol (RSVP), Multiple Spanning Tree Protocol (MSTP), Link Aggregation Control Protocol (LACP), Open Shortest Path First (OSPF), Unidirectional Link Detection (UDLD), Generic Routing Encapsulation (GRE), Rapid Spanning Tree Protocol (RSTP), and others. Keep-alive messages may also be referred to as keep-alive packets.

During normal operation, on the network device, a first network operating subsystem may be operating in an "active" mode and a second network operating subsystem may be operating in a "standby" mode. Examples of network operating subsystems may be virtual machines. For example, a first virtual machine executed by the network device may be executing in active mode and a second virtual machine may be executing in standby mode. The virtual machine operating in active mode may perform a set of networking functions that are not performed by the second virtual machine when operating in standby mode. For example, as part of its networking functions, the active virtual machine may open and maintain one or more keep-alive network sessions. In response to certain events, a failover or switchover may occur that causes the subsystem previously operating in the standby mode prior to the failover to start operating in the active mode and take over performance of the functions performed in active mode. The switchover may cause the first subsystem to start operating in the standby mode. In certain embodiments, the SKAP may be configured to schedule and cause transmission of one or more keep-alive packets for an active keep-alive network session during the switchover. In this manner, even during a switchover, the SKAP enables transmission of keep-alive packets to be continued uninterrupted.

FIG. 1 is a simplified block diagram of a network device 100 (also referred to as a "host system") that may incorporate teachings disclosed herein according to certain embodiments. Network device 100 may be any device that is capable of receiving and forwarding packets, which may be data packets or signaling or protocol-related packets (e.g., keep-alive packets). For example, network device 100 may receive one or more data packets and forward the data packets to facilitate delivery of the data packets to their intended destinations. In certain embodiments, network device 100 may be a router or switch such as various routers and switches provided by Brocade Communications Systems, Inc. of San Jose, Calif.

As depicted in FIG. 1, the example network device 100 comprises multiple components including one or more processors 102, a system memory 104, a packet processor or traffic manager 106, and optionally other hardware resources or devices 108. Network device 100 depicted in FIG. 1 is merely an example and is not intended to unduly limit the scope of inventive embodiments recited in the claims. One of ordinary skill in the art would recognize many possible variations, alternatives, and modifications. For example, in some implementations, network device 100 may have more or fewer components than those shown in FIG. 1, may combine two or more components, or may have a different configuration or arrangement of components. Network device 100 depicted in FIG. 1 may also include (not shown) one or more communication channels (e.g., an interconnect or a bus) for enabling multiple components of network device 100 to communicate with each other.

Network device 100 may include one or more processors 102. Processors 102 may include single or multicore processors. System memory 104 may provide memory resources for processors 102. System memory 104 is typically a form of random access memory (RAM) (e.g., dynamic random access memory (DRAM), Synchronous DRAM (SDRAM), Double Data Rate SDRAM (DDR SDRAM)). Information related to an operating system and programs or processes executed by processors 102 may be stored in system memory 104. Processors 102 may include general purpose microprocessors such as ones provided by Intel®, AMD®, ARM®, Freescale Semiconductor, Inc., and the like, that operate under the control of software stored in associated memory.

As shown in the example depicted in FIG. 1, a host operating system 110 may be loaded in system memory 104 and executed by one or more processors 102. Host operating system 110 may be loaded, for example, when network device 100 is powered on. In certain implementations, host operating system 110 may also function as a hypervisor and facilitate management of subsystems (e.g., virtual machines) and other programs that are executed by network device 100. Managing virtual machines may include partitioning resources of network device 100, including processor and memory resources, between the various programs. A hypervisor is a program that enables the creation and management of virtual machine environments including the partitioning and management of processor, memory, and other hardware resources of network device 100 between the virtual machine environments. A hypervisor enables multiple guest operating systems (GOSs) to run concurrently on network device 100.

As an example, in certain embodiments, host operating system 110 may include a version of a KVM, which is an open source virtualization infrastructure that supports various operating systems including Linux, Windows®, and others. Other examples of hypervisors include solutions provided by VMWare®, Xen®, and others. Linux KVM is a virtual memory system, meaning that addresses seen by programs loaded in executed in system memory are virtual memory addresses that have to be mapped or translated to physical memory addresses of the physical memory. This layer of indirection enables a program running on network device 100 to have an allocated virtual memory space that is larger than the system's physical memory.

In the example depicted in FIG. 1, the memory space allocated to operating system 110 (operating as a hypervisor) is divided into a kernel space 112 and a user space 114 (also referred to as host user space). Multiple virtual machines and host processes may be loaded into host user space 114 and executed by processors 102. The memory allocated to a virtual machine (also sometimes referred to as a guest operating or GOS) may in turn include a kernel space portion and a user space portion. A virtual machine may have its own operating system loaded into the kernel space of the virtual machine. A virtual machine may operate independently of other virtual machines executed by network device 100 and may be unaware of the presence of the other virtual machines.

A virtual machine's operating system may be the same as or different from the host operating system 110. When multiple virtual machines are being executed, the operating system for one virtual machine may be the same as or different from the operating system for another virtual machine. In this manner, hypervisor 110 enables multiple guest operating systems to share the hardware resources (e.g., processor and memory resources) of network device 100.

For example, in the embodiment depicted in FIG. 1, two virtual machines VM-1 116 and VM-2 118 have been loaded into host/guest user space 114 and are being executed by processors 102. VM-1 116 has a kernel space 126 and a user space 124. VM-2 118 has its own kernel space 130 and user space 128. Typically, each virtual machine has its own secure and private memory area that is accessible only to that virtual machine. In certain implementations, the creation and management of virtual machines 116 and 118 may be managed by hypervisor 110, which may be, for example, KVM. While only two virtual machines are shown in FIG. 1, this is not intended to be limiting. In alternative embodiments, any number of virtual machines may be loaded and executed.

Various other host programs or processes may also be loaded into guest user space 114 and be executed by processors 102. For example, as shown in the embodiment depicted in FIG. 1, two host processes 120 and 122 have been loaded into guest user space 114 and are being executed by processors 102. While only two host processes are shown in FIG. 1, this is not intended to be limiting. In alternative embodiments, any number of host processes may be loaded and executed.

In certain embodiments, a virtual machine may run a network operating system (NOS) (also sometimes referred to as a network protocol stack) and be configured to perform processing related to forwarding of packets from network device 100. As part of this processing, the virtual machine may be configured to maintain and manage routing information that is used to determine how a data packet received by network device 100 is forwarded from network device 100. In certain implementations, the routing information may be stored in a routing database (not shown) stored by network device 100. The virtual machine may then use the routing information to program a traffic manager 106, which then performs packet forwarding using the programmed information, as described below.

The virtual machine running the NOS may also be configured to perform processing related to managing sessions for various networking protocols being executed by network device 100. These sessions may then be used to send signaling packets (e.g., keep-alive packets) from network device 100. Sending keep-alive packets enables session availability information to be exchanged between two ends of a forwarding or routing protocol.

In certain implementations, redundant virtual machines running network operating systems may be provided to ensure high availability of the network device. In such implementations, one of the virtual machines may be configured to operate in an "active" mode (this virtual machine is referred to as the active virtual machine) and perform a set of functions while the other virtual machine is configured to operate in a "standby" mode (this virtual machine is referred to as the standby virtual machine) in which the set of functions performed by the active virtual machine are not performed. The standby virtual machine remains ready to take over the functions performed by the active virtual machine. Conceptually, the virtual machine operating in active mode is configured to perform a set of functions that are not performed by the virtual machine operating in standby mode. For example, the virtual machine operating in active mode may be configured to perform certain functions related to routing and forwarding of packets from network device 100, which are not performed by the virtual machine operating in standby mode. The active virtual machine also takes ownership of and manages the hardware resources of network device 100.

Certain events may cause the active virtual machine to stop operating in active mode and for the standby virtual machine to start operating in the active mode (i.e., become the active virtual machine) and take over performance of the set of functions related to network device 100 that are performed in active mode. In one example, the process of a standby virtual machine becoming the active virtual machine is referred to as a failover or switchover. As a result of the failover, the virtual machine that was previously operating in active mode prior to the failover may operate in the standby mode after the failover. A failover enables the set of functions performed in active mode to be continued to be performed without interruption. Redundant virtual machines used in this manner may reduce or even eliminates the downtime of network device's functionality, which may translate to higher availability of network device 100. The set of functions that are performed in active mode, and which are not performed in by the active virtual machine and not performed by the standby virtual machine may differ from one network device to another.

Various different events may cause a failover to occur. Failovers may be voluntary or involuntary. A voluntary failover may be purposely caused by an administrator of the network device or network. For example, a network administrator may, for example, using a command line instruction, purposely cause a failover to occur. There are various situations when this may be performed. As one example, a voluntary failover may be performed when software for the active virtual machine is to be brought offline so that it can be upgraded. As another example, a network administrator may cause a failover to occur upon noticing performance degradation on the active virtual machine or upon noticing that software executed by the active computing domain is malfunctioning.

An involuntary failover typically occurs due to some critical failure in the active virtual machine. This may occur, for example, when some condition causes the active virtual machine to be rebooted or reset. This may happen, for example, due to a problem in the virtual machine kernel, critical failure of software executed by the active virtual machine, and the like. An involuntary failover causes the standby virtual machine to automatically become the active virtual machine.

While many examples herein describe the virtual machine failover or switchover process, the embodiments described herein can apply to any instance where a virtual machine goes down.

In the example depicted in FIG. 1, VM-1 116 is shown as operating in active mode and VM-2 118 is shown as operating in standby mode. The active-standby model enhances the availability of network device 100 by enabling the network device to support various high-availability functionality such as graceful restart, non-stop routing (NSR), and the like.

During normal operation of network device 100, there may be some messaging that takes place between the active virtual machine and the standby virtual machine. For example, the active virtual machine may use messaging to pass network state information to the standby virtual machine. The network state information may comprise information that enables the standby virtual machine to become the active virtual machine upon a failover or switchover in a non-disruptive manner. Various different schemes may be used for the messaging, including but not restricted to Ethernet-based messaging, Peripheral Component Interconnect (PCI)-based messaging, shared memory based messaging, and the like.

Hardware resources 108 or devices may include without restriction one or more field programmable gate arrays (FPGAs), application specific integrated circuits (ASICs), I/O devices, and the like. I/O devices may include devices such as Ethernet devices, PCI Express (PCIe) devices, and others. In certain implementations, some of hardware resources 108 may be partitioned between multiple virtual machines executed by network device 100 or, in some instances, may be shared by the virtual machines. One or more of hardware resources 108 may assist the active virtual machine in performing networking functions. For example, in certain implementations, one or more FPGAs may assist the active virtual machine in performing the set of functions performed in active mode.

As previously indicated, network device 100 may be configured to receive and forward packets to facilitate delivery of the packets to their intended destinations. The packets may include data packets and signal or protocol packets (e.g., keep-alive packets). The packets may be received and/or forwarded using one or more ports 107. Ports 107 represent the I/O plane for network device 100. A port within ports 107 may be classified as an input port or an output port depending upon whether network device 100 receives or transmits a packet using that port. A port over which a packet is received by network device 100 may be referred to as an input port. A port used for communicating or forwarding a packet from network device 100 may be referred to as an output port. A particular port may function both as an input port and an output port. A port may be connected by a link or interface to a neighboring network device or network. In some implementations, multiple ports of network device 100 may be logically grouped into one or more trunks.

Ports 107 may be capable of receiving and/or transmitting different types of network traffic at different speeds, such as speeds of 1 Gigabits per second (Gbps), 10 Gbps, 100 Gbps, or more. Various different configurations of ports 107 may be provided in different implementations of network device 100. For examples, configurations may include 72 10 Gbps ports, 60 40 Gbps ports, 36 100 Gbps ports, and various other combinations.

In certain implementations, upon receiving a data packet via an input port, network device 100 is configured to determine an output port to be used for transmitting the data packet from network device 100 to facilitate communication of the packet to its intended destination. Within network device 100, the packet is forwarded from the input port to the determined output port and then transmitted or forwarded from network device 100 using the output port.

Various different components of network device 100 are configured to cooperatively perform processing for determining how a packet is to be forwarded from network device 100. In certain embodiments, packet processor or traffic manager 106 may be configured to perform processing to determine how a packet is to be forwarded from network device 100. In certain embodiments, packet processor or traffic manager 106 may be configured to perform packet classification, modification, forwarding and Quality of Service (QoS) functions. As previously indicated, traffic manager 106 may be programmed to perform forwarding of data packets based upon routing information maintained by the active virtual machine. In certain embodiments, upon a receiving a packet, traffic manager 106 is configured to determine, based upon information extracted from the received packet (e.g., information extracted from a header of the received packet), an output port of network device 100 to be used for forwarding the packet from network device 100 such that delivery of the packet to its intended destination is facilitated. Traffic manager 106 may then cause the packet to be forwarded within network device 100 from the input port to the determined output port. The packet may then be forwarded from network device 100 to the packet's next hop using the output port.

In certain instances, traffic manager 106 may be unable to determine how to forward a received packet. Traffic manager 106 may then forward the packet to the active virtual machine, which may then determine how the packet is to be forwarded. The active virtual machine may then program traffic manager 106 for forwarding that packet. The packet may then be forwarded by traffic manager 106.

In certain implementations, packet processing chips or merchant ASICs provided by various $3^{rd}$-party vendors may be used for traffic manager 106 depicted in FIG. 1. For example, in some embodiments, Ethernet switching chips provided by Broadcom® may be used. For example, in some embodiments, the Jericho packet processor and traffic manager chip (BCM88670) provided by Broadcom® may be used as traffic manager 106.

Figure 2:
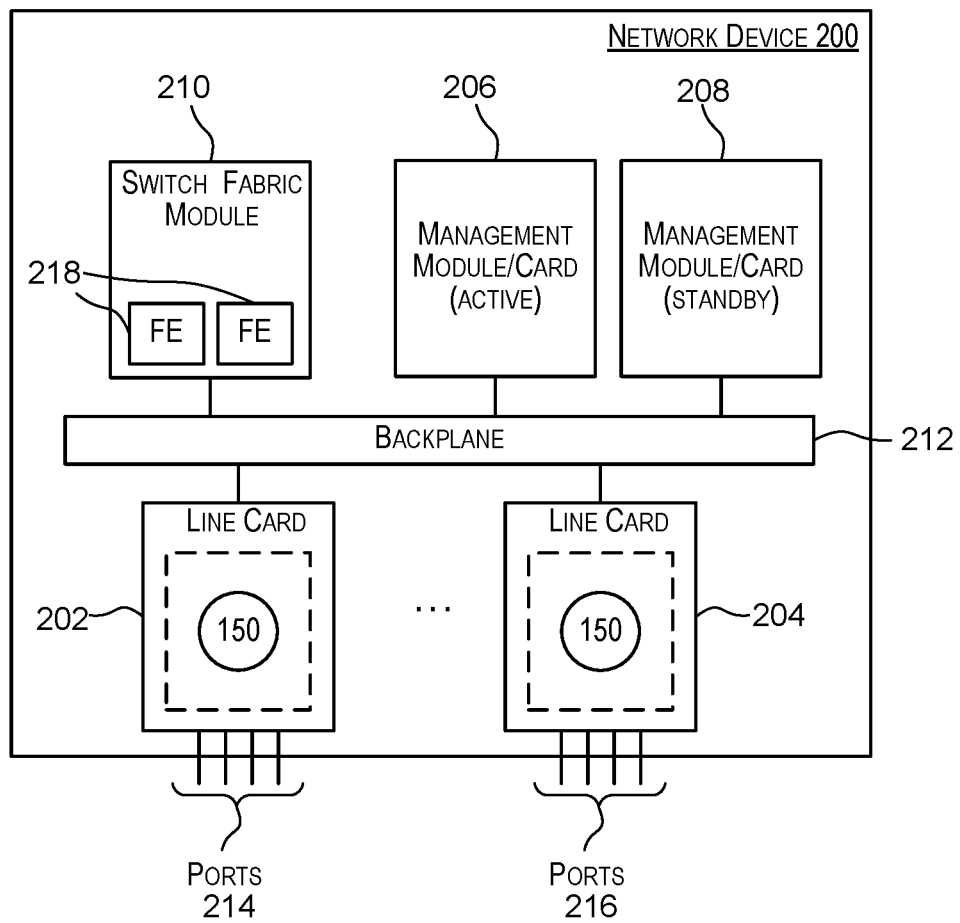
FIG. 2 is a simplified block diagram of yet another network device according to certain embodiments.

FIG. 2 is a simplified block diagram of another example network device 200. Network device 200 depicted in FIG. 2 is commonly referred to as a chassis-based system (network device 100 depicted in FIG. 1 is sometimes referred to as a "pizza-box" system). Network device 200 may be configured to receive and forward packets, which may be data packets or signaling or protocol-related packets (e.g., keep-alive packets). Network device 200 comprises a chassis that includes multiple slots, where a card or blade or module can be inserted into each slot. This modular design allows for flexible configurations, with different combinations of cards in the various slots of the network device for supporting differing network topologies, switching needs, and performance requirements.

In the example depicted in FIG. 2, network device 200 comprises multiple line cards (including first line card 202 and a second line card 204), two management cards/modules 206, 208, and one or more switch fabric modules (SFMs) 210. A backplane 212 is provided that enables the various cards/modules to communicate with each other. In certain embodiments, the cards may be hot swappable, meaning they can be inserted and/or removed while network device 200 is powered on. In certain implementations, network device 200 may be a router or a switch such as various routers and switches provided by Brocade Communications Systems, Inc. of San Jose, Calif.

Network device 200 depicted in FIG. 2 is merely an example and is not intended to unduly limit the scope of inventive embodiments recited in the claims. One of ordinary skill in the art would recognize many variations, alternatives, and modifications. For example, in some embodiments, network device 200 may have more or fewer components than shown in FIG. 2, may combine two or more components, or may have a different configuration or arrangement of components.

In the example depicted in FIG. 2, network device 200 comprises two redundant management modules 206, 208. The redundancy enables the management modules to operate according to the active-standby model, where one of the management modules is configured to operate in standby mode (referred to as the standby management module) while the other operates in active mode (referred to as the active management module). The active management module may be configured to perform management and control functions for network device 200 and may represent the management plane for network device 200. The active management module may be configured to execute applications for performing management functions such as maintaining routing tables, programming the line cards (e.g., downloading information to a line card that enables the line card to perform data forwarding functions), and the like. In certain embodiments, both the management modules and the line cards act as a control plan that programs and makes programming decisions for packet processors or traffic managers in a network device. In a chassis-based system, a management module may be configured as a coordinator of multiple control planes on the line cards.

When a failover or switchover occurs, the standby management module may become the active management module and take over performance of the set of functions performed by a management module in active mode. The management module that was previously operating in active mode may then become the standby management module. The active-standby model in the management plane enhances the availability of network device 200, allowing the network device to support various high-availability functionality such as graceful restart, non-stop routing (NSR), and the like.

In the example depicted in FIG. 2, management module 206 is shown as operating in active mode and management module 208 is shown as operating in standby mode. Management modules 206 and 208 are communicatively coupled to the line cards and switch fabric modules (SFMs) 210 via backplane 212. Each management module may comprise one or more processors, which could be single or multicore processors and associated system memory. The processors may be general purpose microprocessors such as ones provided by Intel®, AMD®, ARM®, Freescale Semiconductor, Inc., and the like, which operate under the control of software stored in associated memory.

A switch fabric module (SFM) 210 may be configured to facilitate communications between the management modules 206, 208 and the line cards of network device 200. There can be one or more SFMs in network device 200. Each SFM 210 may include one or more forwarding elements (FEs) 218. The forwarding elements provide an SFM the ability to forward data from an input to the SFM to an output of the SFM. An SFM may facilitate and enable communications between any two modules/cards connected to backplane 212. For example, if data is to be communicated from one line card 202 to another line card 204 of network device 200, the data may be sent from the first line card 202 to SFM 210, which then causes the data to be communicated to the second line card using backplane 212. Likewise, communications between management modules 206, 208 and the line cards of network device 200 are facilitated using SFMs 210.

In the example depicted in FIG. 2, network device 200 comprises multiple line cards including line cards 202 and 204. Each line card may comprise a set of ports that may be used for receiving and forwarding packets. The ports of a line card may be capable of receiving and/or transmitting different types of network traffic at different speeds, such as speeds of 1 Gbps, 10 Gbps, 100 Gbps, or more. Various different configurations of lien cards ports may be provided in network device 200. For examples, configurations may include four line cards each with 72 10 Gbps ports, eight line cards each with 60 40 Gbps ports, a line card with 36 100 Gbps ports, and various other combinations.

Each line card may include one or more single or multicore processors, a system memory, a traffic manager, and one or more hardware resources. In certain implementations, the components on a line card may be configured similar to the components of network device 100 depicted in FIG. 1 (components collectively represented by reference 150 from FIG. 1 and also shown in line cards 202, 204 in FIG. 2).

A packet may be received by network device 200 via a port on a particular line card. The port receiving the packet may be referred to as the input port and the line card as the source/input line card. The traffic manager on the input line card may then determine, based upon information extracted from the received packet, an output port to be used for forwarding the received packet from network device 200. The output port may be on the same input line card or on a different line card. If the output port is on the same line card, the packet is forwarded by the traffic manager on the input line card from the input port to the output port and then forwarded from network device 200 using the output port. If the output port is on a different line card, then the packet is forwarded from the input line card to the line card containing the output port using backplane 212. The packet is then forwarded from network device 200 by the traffic manager on the output line card using the output port.

In certain instances, the traffic manager on the input line card may be unable to determine how to forward a received packet. The traffic manager may then forward the packet to the active virtual machine on the line card, which then determines how the packet is to be forwarded. The active virtual machine may then program the traffic manager on the line card for forwarding that packet. The packet may then be forwarded to the output port (which may be on input line card or some other line card) the by that traffic manager and then forwarded from network device 200 using via the output port.

In certain instances, the active virtual machine on an input line card may be unable to determine how to forward a received packet. The packet may then be forwarded to the active management module, which then determines how the packet is to be forwarded. The active management module may then communicate the forwarding information the line cards, which may then program their respective traffic managers based upon the information. The packet may then be forwarded to the line card containing the output port (which may be on input line card or some other line card) and then forwarded from network device 200 using via the output port.

Software Keep-Alive Process (SKAP) Architecture

Accordingly, a need exists to be able to transmit keep-alive messages or packets via software when a switchover is being performed from an active subsystem (e.g., virtual machine) to a standby subsystem. The following description describes a software keep-alive process (SKAP) along with the supporting infrastructure and user Application Program Interfaces (APIs). The SKAP may be executed by a software keep-alive subsystem.

Existing solutions use Field Programmable Gate Arrays (FPGAs) or in-house Application Specific Integrated Circuits (ASICs) to provide hardware keep-alive capabilities. However, these solutions typically have limited keep-alive support when implemented in hardware. Thus, a SKAP may provide advantages over a hardware-based keep-alive process, especially in situations involving switchover between network operating subsystems.

It may be desirable for the SKAP to support different keep-alive protocols and their associated requirements. The following table illustrates some (but not all) of the requirements of various keep-alive protocols:

TABLE 1

SKAP Requirements

| KA protocol | Pkt Size (Bytes) | Min Period (Seconds) | Max Sessions per LC | Total Bandwidth per LC (Kbps) |
|---|---|---|---|---|
| IS-IS | 1500-max | 1.0 | 240 | 2,880 |
| RSVP | 88 | 1.0 | 240 | 169 |
| MSTP | 120 | 1.0 | 240 | 230 |
| LACP | 124 | 1.0 | 240 | 238 |
| OSPF | 48 | 1.0 | 1792 | 688 |
| UDLD | 52 | 0.1 | 240 | 998 |
| GRE | 48 | 0.1 | 4,096 | 157,286 |
| RSTP | 120 | 2.0 | 61,440 (240 max breakout x 256 sessions) | 29,491 |
| Total | | | ~68,528 | ~191,980 |

Table 1, above, describes the requirements of various keep-alive protocols. For example, the Intermediate System to Intermediate System (IS-IS) routing protocol supports a packet size between 1500-max bytes, a minimum period of 1 second, 240 max sessions per line card (LC), a total bandwidth per LC of 2,880 Kbps. While this is just one example, the SKAP design may support keep-alives for protocols having even the most aggressive keep-alive timers. For example, the SKAP may support a maximum of 68,000 sessions and a total bandwidth from the LC CPU of 191 Mbps per line card.

A majority of networking protocols are session based with respect to keep-alive sessions. In other words, peers of a protocol exchange keep-alive messages or packets ("heartbeats") to establish and allow continuation of the connectivity amongst them. For a keep-alive network session, failure to send the keep-alive messages or packets in a particular time interval defined by a protocol for that session may result in that session being disconnected and cleanup of the session. Thus, the SKAP has to ensure that the keep-alive messages or packets are transmitted continuously within the expected time intervals. These keep-alive messages or packets also need to be sent during certain scenarios such as, during included software upgrades (a.k.a In Service software Upgrade (ISSU)), planned Active-Standby switchover, unplanned failover, etc., to ensure that the session is not unduly disconnected.

Figure 3:
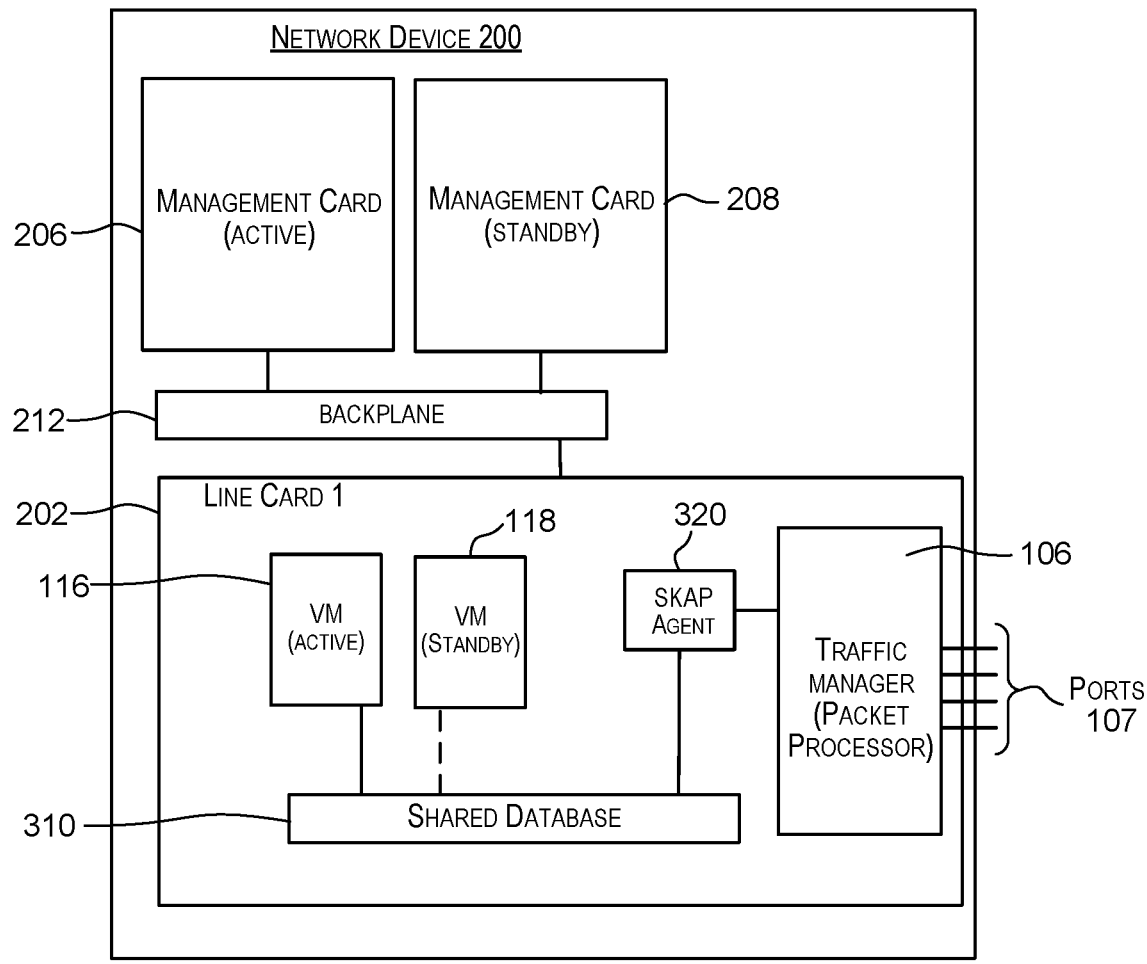
FIG. 3 is a simplified block diagram of a network device including a SKAP agent (process/subsystem) according to certain embodiments.

FIG. 3 is a simplified block diagram of a network device 200 including a SKAP agent 320 according to certain embodiments. The SKAP agent 320 may implement the functionalities of the SKAP described above. SKAP agent 320 is external to both the active virtual machine 116 and the standby virtual machine 118 executing on a line card. SKAP agent 320 may also be referred to as a SKAP process or SKAP subsystem. In certain embodiment, SKAP agent 320 executes on a line card in host space 114 depicted in FIG. 1 (e.g., process-1 120 depicted in FIG. 1 may be SKAP agent 320). The network device 200 thus includes a system external to the active system that is present when the active VM 116 may fail. The management card 206 may include a network OS running multiple protocols that make inter-process communication (IPC) calls to the active VM 116 that may register and setup the keep-alive network sessions along with its out-port duration, packet content, and sequence requirements. Information related to the keep-alive network sessions may be stored in a shared database 310. In certain embodiments, the virtual machine operating in active mode (e.g. VM 116) may write keep-alive network sessions data to the shared database 310. The SKAP agent 320 may read from the inter-virtual machine shared database 310 and send out keep-alive packets using a special scheduler (e.g., SKAP scheduler). In an event that the active VM 116 fails, the standby VM 118 may start the takeover process taking anywhere from a few seconds to a few minutes to complete. Since the SKAP agent 320 is external to the active VM 116 and standby VM 118, and still has access to the shared database 310, keep-alive messages or packets may be continue to be sent during the switchover since the SKAP agent 320 is responsible for the transmission of the keep-alive messages.

When the active VM 116 enters into standby mode and the standby VM 118 becomes the "active VM", the shared database 310 may remain unchanged and the keep-alives may actively be exchanged, despite the switchover, keeping the remote peer protocols "happy".

The SKAP may provide a number of advantages. For example, the SKAP may allow for timeliness (packets are sent regardless of CPU usage), granularity (preciseness), in service software upgrade (ISSU) support (by virtue of the shared database 310 and redundancy), failover (switchover) support, and support for sequence numbers for certain protocols like Unidirectional Link Detection (UDLD).

Further, the architecture described in FIG. 3 may be a "lockless architecture." It can be appreciated that achieving mutual exclusion between the virtual machines and the SKAP agent 320 can be expensive. The lowest level of granularity (e.g., 50 ms) may not be achieved if 68,000 rows are needed to take locks. Thus, 32 bit atomic reads and ownership can be used to achieve the mutual exclusion. This can be done by assuming that the latest update to the shared database 310 may not be needed for the scheduler immediately. Each item can be added to the shared database 310 by the active VM 116 or standby VM 118 with a lock bit set and an ownership bit. If the SKAP agent 320 keeps checking for a valid bit and finds that an invalid bit is set, the SKAP agent 320 may ignore that particular entry if ownership is still with the SKAP agent 320. The active VM 116 may first change the valid bit and then the ownership bit. With a 32 bit read being atomic, there may not be a mutual exclusion issue. Once the active VM 116 changes the ownership, if the valid bit is 0 the entry may be ignored. If the entry made is valid, the entry may be understood to be updated/added and the SKAP agent 320 may then take care of it by changing the ownership to SKAP agent 320.

Additionally, the architecture described may have distributed data structures. The inter virtual machine shared database 310 is available to the VMs 116-118 and the SKAP agent 320 which runs parallel to the VMs in the hypervisor. Hence the shared database 310 can be accessed based on an offset from the memory mapped shared memory. The shared database 310 may be a simple array that allows access based on a keep-alive entry index for deletes and updates. Addition may always done on the first available entry for a specific protocol group, e.g., keep-alive interval order. The maintenance of the free list can also done as an array that references the database table, e.g., an index table or list per protocol group. An additional Georgy Adelson-Velsky and Evgenii Landis' (AVL) tree may be maintained for easy traversal. The AVL tree may be offset based such that both the VMs 116-118 and the SKAP agent 320 can access the tree seamlessly.

Figure 4:
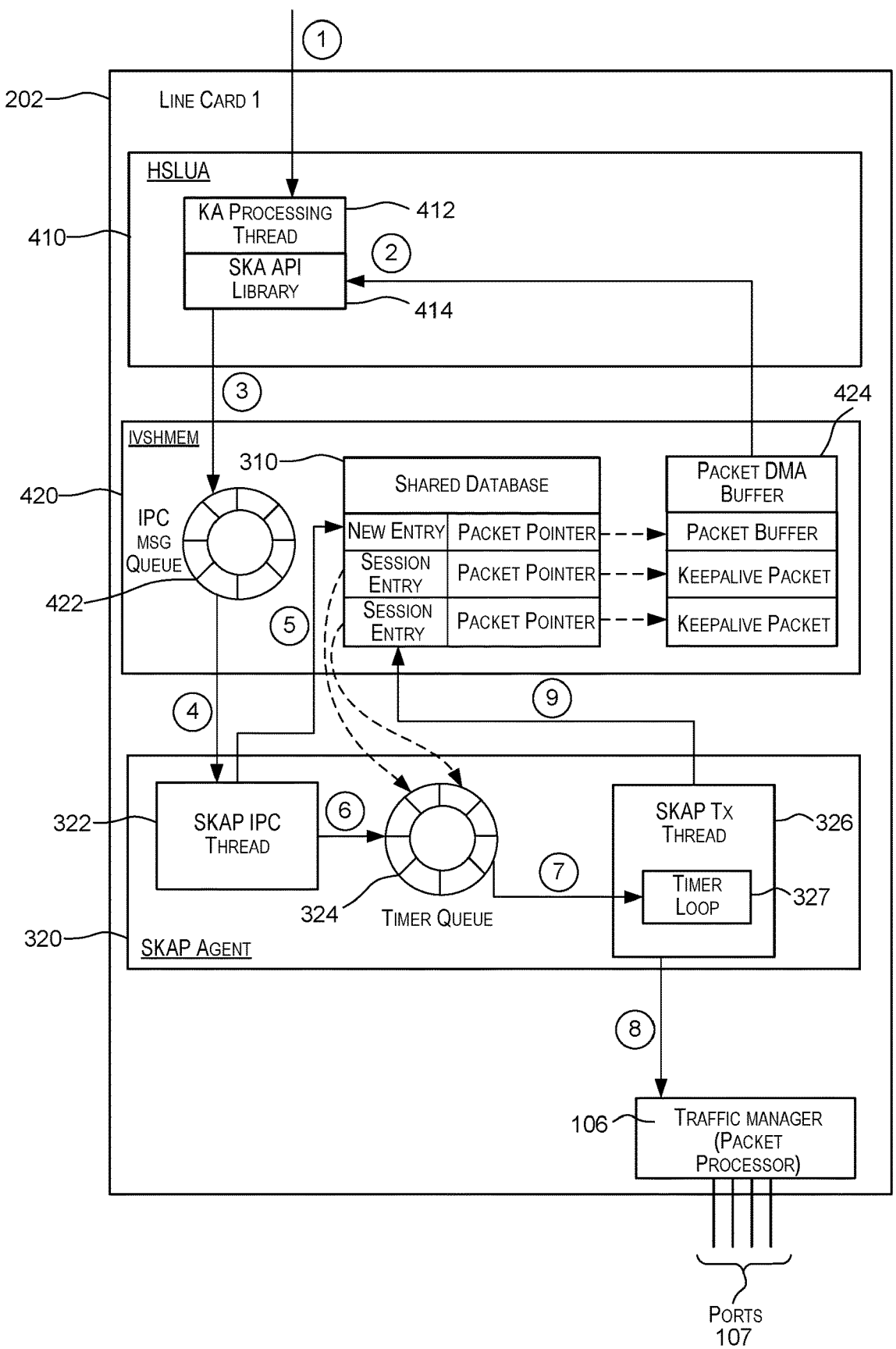
FIG. 4 illustrates interactions for keep-alive setup between the various components of the network device according to some embodiments.

FIG. 4 illustrates interactions for keep-alive setup between the Hardware Subsystem Layer-User Agent (HSLUA) 410, shared database 310 within an inter-VM shared memory (IVSHMEM) 420, and SKAP agent 320 according to some embodiments. The HSLUA 410, IVSHMEM 420, and SKAP agent 320 may reside within the first line card 202.

At step 1, the management module/card protocol modules may transmit inter-process communication (IPC) messages to the first line card 202 in order to setup the keep-alive transmits. For example, management card 206 may transmit the IPC messages to the first line card 202 via backplane 212. The IPC messages from the management card 206 may be received by a KA processing thread 412 within the HSLUA 410.

At step 2, after the KA processing thread 412 receives the IPC messages from the management card 206, the HSLUA 410 may allocate a software keep-alive packet buffer to build the keep-alive packet. The software keep-alive packet buffer may be allocated within a packet DMA buffer 424 that resides within the IVSHMEM 420.

At step 3, after the HSLUA 410 allocates a software keep-alive packet buffer to build the keep-alive packet, the HSLUA 410 may call the software keep-alive API library 414 to set up the session as an entry in the shared database 310 located within the IVSHMEM 420. The shared database 310 entry may point to the packet buffer allocated in step 2, above.

At step 4, after the software keep-alive API library 414 sets up the keep-alive network session as an entry in the shared database 310, the SKAP main thread 322 may scan the shared database 310 and may determine the keep-alive network sessions to be added to a transmit queue 324 based on the keep-alive network session's associated transmit interval. The SKAP main thread 322 may execute within the SKAP agent 320.

At step 5, after the SKAP main thread 322 determines the sessions to be added to a transmit queue 324, SKAP main thread 322 may add the session to the transmit queue 324. The transmit queue 324 may be a sorted queue (tree) that allows quick checking of sessions that are ready to be transmitted.

At step 6, after the SKAP main thread 322 adds the session to the transmit queue 324, a SKAP packet transmit driver 326 checks the transmit queue 324 for sessions in the timer queue 324 that are ready to be transmitted. A timer loop 327 within the SKAP main thread 322 may dictate the predefined interval at which the SKAP packet transmit driver 326 wakes up to check the transmit queue 324 for sessions in the transmit queue 324 that are ready to be transmitted.

At step 7, after the SKAP packet transmit driver 326 checks the transmit queue 324 for sessions that are ready to be transmitted, the SKAP packet transmit driver 326 may transmit packets for keep-alive network sessions that are ready to be transmitted.

At step 8, after the SKAP packet transmit driver 326 transmits packets for the keep-alive network sessions that are ready to be transmitted, the SKAP packet transmit driver 326 may update the transmit time stamp at which packets were transmitted for the keep alive sessions.

In one example, the SKAP main thread 322 may use timer loop 327 at a period of 10 ms in order to schedule packets to be sent out. The sessions may be added to the transmit queue 324 which may be sorted in order of expiration time for efficiency. The SKAP packet transmit driver 326 may wake up every 10 ms (when the timer loop 327 timer expires) and may check the timer queue 324 for any sessions that have expired timers. Packets may be sent for any sessions that have expired timers. When adding sessions to the timer queue 324, a random time from 1 ms to 100 ms may be added to the initial timer expiration to stagger the timer expirations of each session. Doing so may spread out session expiration times which may prevent many sessions from expiring at the same time and causing a higher CPU load.

The shared database 310 may contain a total of approximately 68,000 entries (keep-alive network sessions). The following table illustrates attributes stored for each keep-alive network session stored in the shared database 310:

TABLE 2

Shared database entry fields

| Field | Description |
| --- | --- |
| Lock | Used to lock entry for modification |
| Valid | 1 = Valid |
|  | 0 = Invalid |
| User | 0 = Invalid |
|  | 1 = VM0 |
|  | 2 = VM1 |
|  | 3 = SKAP SCHED |
| Overflow | 1 = Overflow, indicating that this session was not added into TxQ in last cycle due to bank full. This session is prioritized in the next immediate TxQ setup. |
|  | 0 = Not overflow |
| Debug Flag | 0 = Session Debug Disabled |
|  | 1 = Session Debug Enabled |
| CRC Flag | 0 = Disable CRC Check |
|  | 1 = Enable CRC Check |
| Protocol | Identifies the KA protocol of session |
| If Index | Identifies the interface of session |
| Vlan | Identifies the Vlan of session |
| CRC Result | CRC value calculated during the KA registration |
| Last Bank | Bank in which this session was stored in last TxQ setup cycle |
| Frequency | KA time interval |
| R Seq ID | Remote Sequence ID in the packet |
| L Seq ID | Local Sequence ID in the packet |
| Seq Offset | Sequence offset in Packet |
| Packet Offset | Offset at which PDU is stored in ivshmem |
| Reg Time | Time tick at which session is registered |
| Last Tx Time | Last packet tx time tick |
| Min Latency | Minimum Latency |
| Max Latency | Maximum Latency |
| Packet count | Number of packets transmitted |

The following table shows exemplary contents of the shared database 310:

TABLE 3

Example shared database entries

| Valid | Lock | User | Interval(ms) | Protocol | Sequence ID Start | Sequence Field Offset | Packet Offset | Registration Time |
| --- | --- | --- | --- | --- | --- | --- | --- | --- |
| 1 | 0 | SKAP | 100 | UDLD | 150 | 32 | 0xf0000 | 151006_0823.450 |
| 1 | 1 | VM1 | 6000 | LACP | 0 | 0 | 0xf0080 | 151006_0923.125 |
| 1 | 0 | VM0 | 2000 | STP | 0 | 0 | 0xf0100 | 151006_0823.450 |
| 0 | 0 | VM0 | 500 | UDLD | 0 | 32 | 0xf0180 | 151006_0923.450 |

As shown in Table 3 above, the following attributes may be stored for each keep-alive network session in the shared database 310: entry valid bit, lock bit, user, time interval, protocol, sequence ID start, sequence field offset, packet offset, and registration time. While Table 3 depicts just a few of the attributes illustrated in Table 2, any number of attributes illustrated in Table 2 may be stored for each Software Keep-Alive Process (SKAP) Scheduler As described above, the SKAP agent 320 may include a scheduler (SKAP scheduler) for sending the keep-alive messages/packets stored in the shared database 310. A scheduler may be important because applications require real-time scheduling support of a very large number of periodic timers for various keep-alive network sessions. The software-based keep-alive process is an example of such an application. The SKAP agent 320 may have real-time requirements, may need to be able to scale to tens of thousands of periodic keep-alive network sessions, and may need to be able to adjust for bounded latency and jitter to support some requirements of stricter networking protocols.

Different network protocols may have different keep-alive requirements. In some embodiments, the SKAP scheduler may accommodate a max of 68,528 sessions (e.g., in the case of fully scaled and most aggressive timers). In some other embodiments, even more keep-alive network sessions may be supported.

Referring again to FIG. 4, the transmit queue 324, the SKAP packet transmit driver 326 and SKAP main thread 322 may together make up the SKAP scheduler. The SKAP scheduler may interface with the shared database 310 and the packet DMA buffer 424, which both reside within the IVSHMEM 420. As described above, the IVSHMEM 420 can be accessed by the VMs and the host. In some embodiments, the SKAP scheduler may make use of a single monotonic timer having a period of 10 ms. Each 10 ms time period may be regarded as one "time tick". The time tick value may reset for every 100 ms (e.g., 10 ticks). The shared database 310 may be scanned every 100 ms (e.g., 10 time ticks) and contents may be placed in the timer queue 324. The contents of the timer queue 324 may include the session IDs of the keep-alives to be transmitted within the next 100 ms. The timer queue 324 may be divided to into a set of 10 banks, each bank corresponding to a 10 ms time period. In some embodiments, each bank may hold up to 4500 packets as the SKAP packet transmit driver 326 can transmit up to 4500 packets per every 10 ms interval.

In addition to the packet DMA buffer 424 and the shared database 310, the IVSHMEM 420 may also contain a time stamp that can be incremented every 10 ms, and a max session ID field indicating the maximum session ID allocated by the HSLUA. The time stamp field within the IVSHMEM 420 can be used to manage VM/host time synchronization. The host scheduler may increment a 64-bit time stamp field every 10 ms. The max session ID field may be updated by the HSLUA. This may help in optimizing the SKAP scheduler to check for valid sessions up until the present max session ID.

Figure 5A:
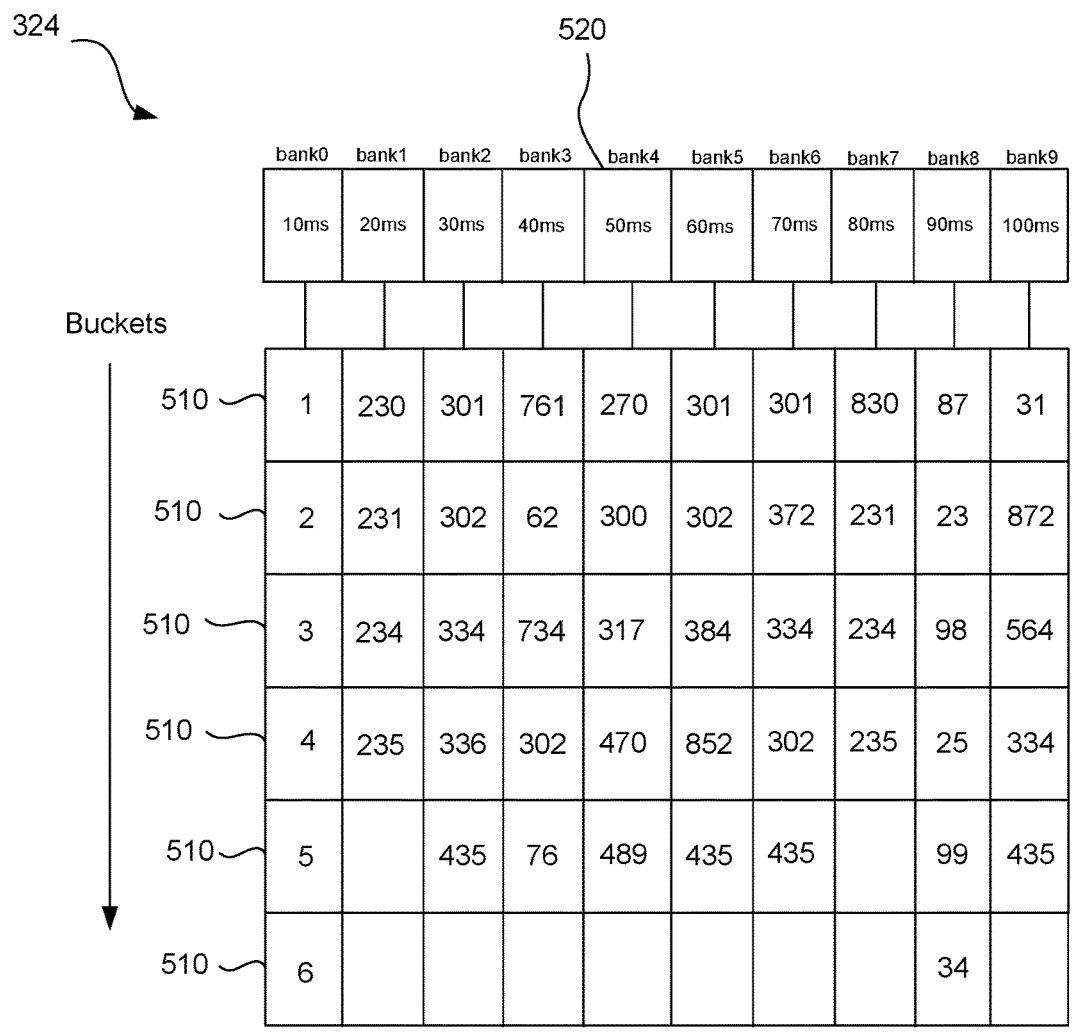
FIG. 5A illustrates a timer queue having a plurality of buckets holding sessions IDs associated with keep-alive network sessions.

FIG. 5A illustrates a timer queue 324 having a plurality of buckets 510 holding sessions IDs associated with keep-alive network sessions, according to some embodiments. The timer queue 324 may be configured to store session IDs of keep-alive network sessions that need to be transmitted within the next 100 ms time period. The SKAP scheduler may scan valid entries in the shared database 310 for packet transmit scheduling. Sessions to be transmitted in the next 100 ms may be added to an appropriate 10 ms bank of a transmit queue.

Typically, a session timeout of most protocols occurs after three missed keep-alive packets. After three missed keep-alive packets, the protocol may consider the session link to be broken or down. As described above, when a session starts, session information may be written into the shared database 310. Every 100 ms, the SKAP scheduler may scan the shared database 310 to determine the number of keep-alive packets that need to be sent over the next 100 ms time period and at which time period within the next 100 ms they actually need to transmitted. Any keep-alive network sessions that need to be transmitted in the next 100 ms (based on the last transmit time), can be moved into the timer queue 324. As shown in the figure, each bucket 510 displays a session ID for the particular session. The sessions can be populated across the ten banks 520 depicted. Each bank 520 may hold the session IDs within the buckets 510 for the keep-alive network sessions that need to be transmitted within the time period defined by the particular bank 520. For example, "bank 2" may contain the sessions IDs within each bucket 510 for keep-alive network sessions that need to be transmitted within the next 30 ms time period. The session IDs stored in the buckets 510 associated with "bank 2" include session IDs 301, 302, 334, 336, 435. In another example, "bank 4" may contain the session IDs within each bucket 510 for keep-alive network sessions that need to be transmitted within the next 50 ms time period. The session IDs stored in the buckets 510 associated with "bank 4" include 270, 300, 317, 470, 489. While 100 ms is used as the example time period when the SKAP scheduler scans the shared database 310, any time period may be used in other embodiments.

Figure 5B:
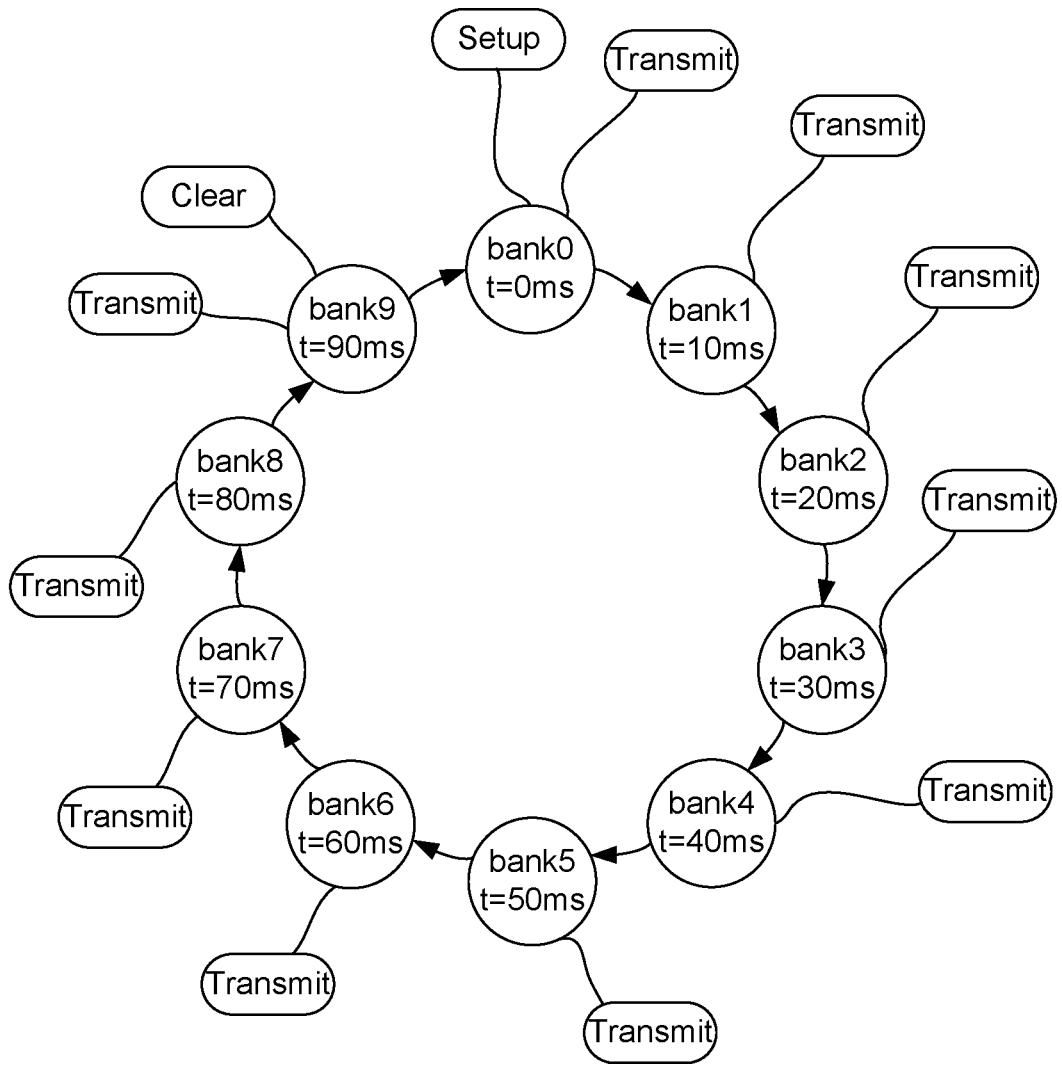
FIG. 5B illustrates a timer queue having a plurality of buckets holding sessions IDs associated with keep-alive network sessions.

Every 100 ms, the shared database 310 may be scanned again and the timer queue 324 may be update to reflect the keep-alives that need to be transmitted over the next 100 ms from time t=0. For example, looking at the timer queue 324 depicted in the figure, at time t=0 keep-alives for the following session IDs (in bank0) need to be transmitted need to be transmitted in the next 10 ms: 1, 2, 3, 4, 5, 6. At time t=10 ms, the keep-alives for the session IDs in bank0 may have been transmitted and the process for transmitting the keep-alives associated with the session IDs in bank1 may begin. Similarly, the keep-alives for the session IDs stored in each bank 520 may be transmitted at every 10 ms interval. For example, at time t=20 ms, the keep-alives for the session IDs in bank2 may begin, and so on and so forth. This is depicted with respect to FIG. 5B. When keep-alives associated with session IDs in bank 9 are transmitted, the banks 520 may be cleared and the process my start over by scanning the shared database 310 and populating the banks 520 again.

In some embodiments, the SKAP scheduler may be able to auto adjust for skew. For example, when a keep-alive network session has a time interval less than one second and greater than or equal to 100 ms, the session may be randomly distributed in the nearest five banks within the range of the original bank. In the case where the session has a time interval greater than one second, the session may be randomly distributed in any of the 10 banks. In the case where the session has a time interval below 100 ms, no randomizing of the session distribution may take place. By randomizing the keep-alive network sessions that do not need to be transmitted within the next 100 ms, more flexibility may be achieved for transmitting the keep-alive packets since there is no urgency in transmitting keep-alive network sessions that do not need to be transmitted within the next 100 ms. Keep-alive network sessions that need to be transmitted with more urgency (e.g., in the next 100 ms) may be placed in the banks 520 with lower chances of the banks 520 being filled since the less urgent keep-alive network sessions may be randomized.

Additionally, overflow may be enabled for sessions which missed being assigned to a bank in the last setup cycle due the banks being full. This particular session entry may be given priority to add into current transmission setup cycle. For example, if a particular keep-alive network session could not be placed in any of the banks 520 due to the banks 520 already being filled, that particular keep-alive network session may be given priority for bank 520 assignment in the next cycle (e.g. at t=100 ms) of setting up the timer queue 324. These concepts may be further understood in the following description of FIG. 6.

Figure 6:
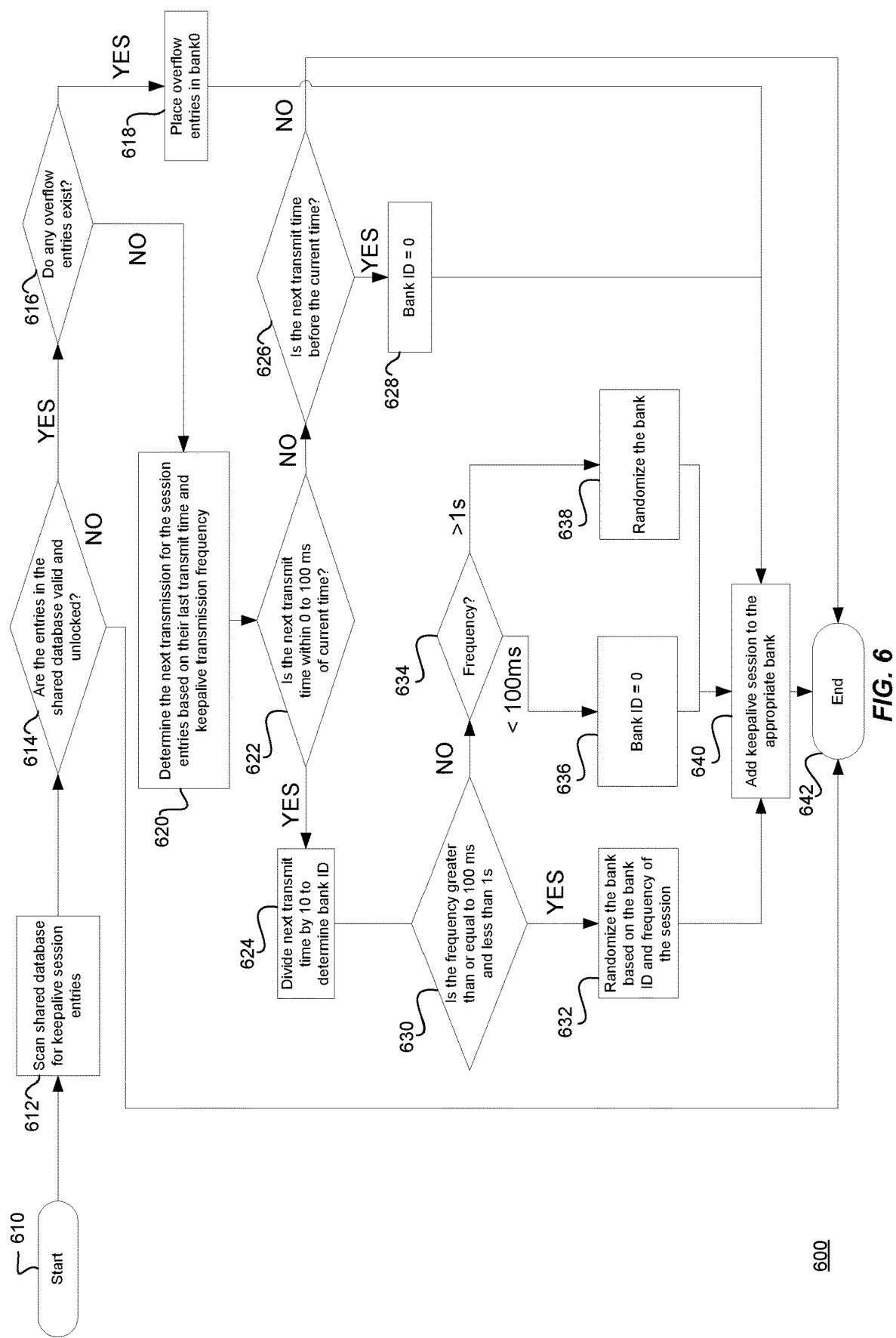
FIG. 6 is a flowchart illustrating the process of the SKAP scheduler according to some embodiments.

FIG. 6 is a flowchart 600 illustrating the process of the SKAP scheduler according to some embodiments. The flowchart 600 illustrates the process of placing session IDs associated with the keep-alive network sessions for which keep-alive packets need to be transmitted into appropriate banks within the timer queue. The process of scheduling keep-alive network sessions begins at block 610.

At block 612, each keep-alive network session entry in the shared database is scanned. The keep-alive network session entries may have been placed into the shared database by one or more virtual machines executing on the network device. The shared database may reside within a line card and be accessible by the one or more virtual machines. The shared database more store entries for keep-alive network sessions associated with one or more protocols running n the network device.

At block 614, after each entry in the shared database is scanned, a determination is made whether the keep-alive network session entries in the shared database are valid and unlocked. If they are both valid and unlocked, the process may continue to block 616. Otherwise, if an entry is invalid or locked, the scheduling for that particular entry may not occur and the process may end at block 642.

At block 616, after the determination is made that the entry is valid and unlocked, a determination is made whether the entry is an overflow entry. An overflow entry may be considered an entry for a keep-alive network session that for some reason was not able to be assigned to a particular bank in the timer queue for keep-alive scheduling. One example of such a reason is that no banks were available in the timer queue for the previous cycle. Accordingly, if an entry is an overflow entry it may be given the highest priority for the present timer queue cycle and may be assigned to bank0, where entries within bank0 will be transmitted within the next 10 ms (block 618). The process may then continue from block 618 to block 640 where the session entry may be placed in the appropriate bank within the timer queue.

Otherwise, if the entry is not an overflow entry, the process may continue to block 620.

At block 620, after determining that the entry is not an overflow entry, a next transmission time for the entry is determined based on its last transmit time and the frequency of the keep-alive transmission. For example, the time for the next keep-alive transmission for the session may be determined by taking the last keep-alive transmission time for the session and adding the keep-alive frequency to it.

At block 622, after determining the next keep-alive transmission time for the session entry, a determination is made whether the determined next keep-alive transmission time for the session entry falls within the next 100 ms. If it is determined that the next keep-alive transmission time for the session entry does not fall within the next 100 ms, a determination is made whether the next transmit time is before the current time (block 626). In other words, a determination is made whether the keep-alive transmission was missed for the particular session entry and the transmission is now overdue. If the transmission was missed, the session entry may be assigned bank0 (block 628) and then placed into bank0 (block 640). Otherwise, if the next transmission time for the session entry is not before the current time, the process may end at block 642. In other words, it may be determined that session entry is not overdue and the next keep-alive transmission time does not fall within the next 100 ms, so it may not be imperative to schedule the keep-alive transmission for the session entry during the current 100 ms cycle of the timer queue.

Referring again to block 622, if a determination is made that the next transmission time for the session entry is within the next 100 ms of the current time, the next transmission time may be divided by modulo 10 to determine a bank ID for the session entry. For example, if the next transmission time for the session entry is 54 ms from the current time, the bank ID for the session entry may be determined to be 5. The process may then continue to block 630.

At block 630, after the bank ID for the session entry is determined, a determination is made whether the keep-alive frequency associated with the session entry is greater than or equal to 100 ms and less than is. If is determined that the keep-alive frequency associated with the session entry is greater than or equal to 100 ms and less than is, the bank assignment for the entry may be randomized, at block 632, based on the bank ID determined in block 624 and the frequency of the session entry. For example, if the bank ID determined in block 624 is less than 5, the session entry may be assigned to a random bank between bank0-bank4 (e.g., the 5 highest banks in terms of priority). Otherwise, if the bank ID determined in blocked 624 is greater than or equal to 5, the session entry may be assigned randomly anywhere between bank0-bank9 (e.g., any of the ten banks). Once the bank assignment of the session entry is complete, the session entry may be added to the appropriate bank in the timer queue (block 640).

Referring again to block 630, if it is determined that the keep-alive frequency associated with the session entry is not greater than or equal to 100 ms and less than is, a determination is made whether the keep-alive frequency associated with the session entry is less than 100 ms or greater than is (block 634). If is determined that the keep-alive frequency associated with the session entry is greater than is, the bank assignment for the session entry is randomized across any of the ten banks (e.g., bank0-bank9) (block 638). Otherwise if it is determined that the keep-alive frequency associated with the session entry is less than 100 ms, the session entry may be given a bank assignment without randomization (block 636). In either case, after the bank assignment is determined, the keep-alive network session may be added to the appropriate bank in block 640.

In the above exemplary process flow, the thresholds used in the processing are not intended to be limiting, and other threshold may be used in alternative embodiments.

The scheduler may be referred to as "self-healing" in the sense that any overdue keep-alive transmissions may be corrected in a future scheduling cycle. The SKAP scheduler also provides many benefits. It provides for real-time scheduling that is deterministic in the sense that it is a simple static algorithm that is robust with low overhand and offers bounded max latency and jitter. It may only use one single monotonic OS timer. The scheduler may scale to a very high scale of periodic timers (e.g., tens of thousands) in addition to supporting variable timer periods and prioritized scheduling. Further, it may support variable timer periods, prioritized scheduling, and minimum CPU impact. Further, as described, the scheduler auto-adjusts for skew and prioritizes high frequency protocols.

It can be appreciated that while the SKAP architecture and scheduler described above is described with respect to specific examples, the SKAP architecture and scheduler can be extended to any control processor having a shared database accessible by multiple subsystems. For example, the control processor can be a part of one or more network processors.

In certain embodiments, a non-transitory machine-readable or computer-readable medium is provided for storing data and code (instructions) that can be executed by one or more processors. Examples of non-transitory machine-readable or computer-readable medium include memory disk drives, Compact Disks (CDs), optical drives, removable media cartridges, memory devices, and the like. A non-transitory machine-readable or computer-readable medium may store the basic programming (e.g., instructions, code, program) and data constructs, which when executed by one or more processors, provide the functionality described above. In certain implementations, the non-transitory machine-readable or computer-readable medium may be included in a network device and the instructions or code stored by the medium may be executed by one or more processors of the network device causing the network device to perform certain functions described above. In some other implementations, the non-transitory machine-readable or computer-readable medium may be separate from a network device but can be accessible to the network device such that the instructions or code stored by the medium can be executed by one or more processors of the network device causing the network device to perform certain functions described above. The non-transitory computer-readable or machine-readable medium may be embodied in non-volatile memory or volatile memory.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Features described with respect to certain embodiments may be combined in various other embodiments. Different aspects and elements of the embodiments may be combined in a similar manner. Technology evolves and, thus, many of the elements are examples that do not limit the scope of the disclosure to those specific examples.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

Although specific embodiments have been described, various modifications, alterations, alternative constructions, and equivalents are also encompassed within the scope of described embodiments. Embodiments described herein are not restricted to operation within certain specific data processing environments, but are free to operate within a plurality of data processing environments. Additionally, although certain implementations have been described using a particular series of transactions and steps, it should be apparent to those skilled in the art that these are not meant to be limiting and are not limited to the described series of transactions and steps. Although some flowcharts describe operations as a sequential process, many of the operations can be performed in parallel or concurrently. In addition, the order of the operations may be rearranged. A process may have additional steps not included in the figure.

Further, while certain embodiments have been described using a particular combination of hardware and software, it should be recognized that other combinations of hardware and software may also be provided. Certain embodiments may be implemented only in hardware, or only in software (e.g., code programs, firmware, middleware, microcode, etc.), or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
   executing on a network device a first virtual machine in an active mode and a second virtual machine in a standby mode;
   reading a database configured to store data for a network session for the first virtual machine;
   determining, using data read from the database, a next transmission time associated with the network session, wherein the next transmission time determines when to send a keep-alive packet for the network session;
   determining that the next transmission time is within a next time period from a current time;
   placing, based on determining that the next transmission time is within the next time period, an identifier for the network session in a first bank of a timer queue of the network device, wherein the first bank stores identifiers for network sessions for which keep-alive packets are to be sent upon termination of the next time period, wherein the timer queue executes external to the first virtual machine and the second virtual machine; and
   after the first virtual machine fails, transmitting by the network device the keep-alive packet for the network session within the next time period, thereby preventing the network session from terminating.

2. The method of claim 1, wherein the data read from the database includes a previous transmission time and a transmission frequency, wherein a previous keep-alive packet was sent for the network session, and wherein the next transmission time is determined based on the previous transmission time and the transmission frequency.

3. The method of claim 1, wherein the timer queue further includes a second bank configured to store identifiers for network sessions for which keep-alive packets are to be sent within a subsequent time period following the next time period.

4. The method of claim 1, wherein the database is accessible by the first virtual machine and the second virtual machine, and the first and second virtual machines are executed by a line card of the network device.

5. The method of claim 4, wherein at least one of the first virtual machine or the second virtual machine stores data in the database for the network session.

6. The method of claim 4, wherein:
when the first virtual machine operates in the active mode, the first virtual machine performs a set of functions to facilitate forwarding of data packets from the network device; and
the second virtual machine operates in the standby mode while the first virtual machine operates in the active mode, wherein the second virtual machine does not perform the set of functions when operating in the standby mode.

7. The method of claim 1, wherein, when the next transmission time is before the current time, the identifier for the network session is placed in a highest priority bank.

8. The method of claim 1, further comprising:
switching the second virtual machine to the active mode from the standby mode after the first virtual machine fails.

9. The method of claim 8, wherein the keep-alive packet for the network session is transmitted before the second virtual machine switches to the active mode from the standby mode.

10. The method of claim 1, wherein the database is accessible by both the first virtual machine and the second virtual machine.

11. A network device comprising:
a first virtual machine in an active mode executing on the network device;
a second virtual machine in a standby mode executing on the network device;
a database configured to store data for one or more network sessions for the network device;
one or more processors executing a keep-alive subsystem process external to the first virtual machine and the second virtual machine, wherein the keep-alive subsystem process is configured to:
read the database;
determine, using data read from the database, a next transmission time associated with a network session from the one or more network sessions, wherein the next transmission time determines when to send a keep-alive packet for the network session;
determine that the next transmission time is within a next time period from a current time;
place, based on determining that the next transmission time is within the next time period, an identifier for the network session in a first bank of a timer queue of the network device, wherein the first bank stores identifiers for network sessions for which keep-alive packets are to be sent upon termination of the next time period; and
after the first virtual machine fails, transmit the keep-alive packet for the network session within the next time period, thereby preventing the network session from terminating.

12. The network device of claim 11, wherein the data read from the database includes a previous transmission time and a transmission frequency, wherein a previous keep-alive packet was sent for the network session, and wherein the next transmission time is determined based on the previous transmission time and the transmission frequency.

13. The network device of claim 11, wherein the timer queue further includes a second bank configured to store identifiers for network sessions for which keep-alive packets are to be sent within a subsequent time period following the next time period.

14. The network device of claim 11, wherein, when the next transmission time is before the current time, the identifier for the network session is placed in a highest priority bank.

15. The network device of claim 11, wherein the database is accessible by the first virtual machine and the second virtual machine, and the first and second virtual machines are executed by a line card of the network device.

16. The network device of claim 15, wherein at least one of the first virtual machine or the second virtual machine stores data for the one or more network sessions in the database.

17. The network device of claim 15, wherein:
when the first virtual machine operates in the active mode, the first virtual machine performs a set of functions to facilitate forwarding of data packets from the network device; and
the second virtual machine operates in the standby mode while the first virtual machine operates in the active mode, wherein the second virtual machine does not perform the set of functions when operating in the standby mode.

18. A non-transitory computer-readable media storing computer-executable instructions that, when executed by one or more computing devices, cause the one or more computing devices to:
execute on a network device a first virtual machine in an active mode and a second virtual machine in a standby mode;
read a database configured to store data for a network session for the first virtual machine;
determine, using data read from the database, a next transmission time associated with the network session, wherein the next transmission time determines when to send a keep-alive packet for the network session;
determine that the next transmission time is within a next time period from a current time;
place, based on determining that the next transmission time is within the next time period, a identifier for the network session in a first bank of a timer queue of the network device, wherein the first bank stores identifiers for network sessions for which keep-alive packets are to be sent upon termination of the next time period, wherein the timer queue executes external to the first virtual machine and the second virtual machine; and
after the first virtual machine fails, transmit by the network device the keep-alive packet for the network session within the next time period, thereby preventing the network session from terminating.

19. The non-transitory computer-readable media of claim 18, wherein the data read from the database includes a previous transmission time and a transmission frequency, wherein a previous keep-alive packet was sent for the network session, and wherein the next transmission time is determined based on the previous transmission time and the transmission frequency.

20. The non-transitory computer-readable media of claim 18, wherein the timer queue further includes a second bank configured to store identifiers for network sessions for which keep-alive packets are to be sent within a subsequent time period following the next time period.

21. The non-transitory computer-readable media of claim 18, wherein if the next transmission time is before the current time, the identifier for the network session is placed in a highest priority bank.

22. The non-transitory computer-readable media of claim 18, wherein the database is accessible by the first virtual machine and the second virtual machine, and the first and second virtual machines are executed by a line card of the network device.

23. The non-transitory computer-readable media of claim 22, wherein at least one of the first virtual machine or the second virtual machine stores data in the database for the network session.

24. The non-transitory computer-readable media of claim 22, wherein:
   when the first virtual machine operates in the active mode, the first virtual machine performs a set of functions to facilitate forwarding of data packets from the network device; and
   the second virtual machine operates in the standby mode while the first virtual machine operates in the active mode, wherein the second virtual machine does not perform the set of functions when operating in the standby mode.

\* \* \* \* \*